United States Patent
Chang

[19]

[11] Patent Number: 6,026,202
[45] Date of Patent: *Feb. 15, 2000

[54] COMPACT, LOW CROSSTALK, THREE-PORT OPTICAL CIRCULATOR

[75] Inventor: Kok-Wai Chang, Sunnyvale, Calif.

[73] Assignee: Hewlett-Packard Company, Palo Alto, Calif.

[*] Notice: This patent is subject to a terminal disclaimer.

[21] Appl. No.: 08/805,001

[22] Filed: Feb. 25, 1997

[51] Int. Cl.[7] .................................................. G02B 6/27

[52] U.S. Cl. ......................... 385/11; 359/488; 359/497; 385/15

[58] Field of Search .................. 385/11, 15, 27; 359/488, 494–497, 499

[56] References Cited

U.S. PATENT DOCUMENTS

| | | | |
|---|---|---|---|
| 4,178,073 | 12/1979 | Uchida et al. | 359/484 |
| 4,974,944 | 12/1990 | Chang | 359/497 |
| 5,151,955 | 9/1992 | Ohta et al. | 385/6 |
| 5,204,771 | 4/1993 | Koga | 359/495 X |
| 5,212,586 | 5/1993 | Van Delden | 359/496 X |
| 5,237,445 | 8/1993 | Kuzuta | 359/281 |
| 5,262,892 | 11/1993 | Shinkosha | 359/484 |
| 5,315,431 | 5/1994 | Masuda et al. | 359/281 |
| 5,381,261 | 1/1995 | Hirai et al. | 359/282 |
| 5,428,477 | 6/1995 | Siroki | 359/484 |
| 5,446,578 | 8/1995 | Chang et al. | 359/282 |
| 5,471,340 | 11/1995 | Cheng et al. | 359/281 |
| 5,539,574 | 7/1996 | Robinson | 359/484 |
| 5,557,692 | 9/1996 | Pan et al. | 385/11 |
| 5,574,596 | 11/1996 | Cheng | 359/484 |
| 5,729,377 | 3/1998 | Bergmann | 359/495 X |
| 5,734,763 | 3/1998 | Chang | 385/11 |

FOREIGN PATENT DOCUMENTS

| | | | |
|---|---|---|---|
| 0 491 607 A2 | 6/1992 | European Pat. Off. | G02B 27/10 |
| 0 512 572 A2 | 11/1992 | European Pat. Off. | G02F 1/09 |
| 04116616 | 4/1992 | Japan | G02B 27/28 |
| WO 94/09400 | 4/1994 | WIPO | G02F 1/09 |
| WO 97/22034 | 6/1997 | WIPO | G02B 6/27 |

OTHER PUBLICATIONS

Koga, Masafumi and Matsumoto, Takao, "High–Isolation Polarization–Insensitive Optical Circulator for Advanced Optical Communications Systems", Journal of Lightwave Technology, vol. 10, No. 9, Sep. 1992, pp. 1210–1217.

Shinkosha, Isolator Revolution, ISO–SPI Data Sheet, 2 pp. No Date.

Koga, M,: "Compact Quartzless Optical Quasi–Circulator", Electronics Letters, vol. 30, No. 17, Aug. 18, 1994, pp. 1438–1440.

*Primary Examiner*—John D. Lee
*Attorney, Agent, or Firm*—Ian Hardcastle

[57] ABSTRACT

A miniature three-port optical circulator that comprises a first input/output (I/O) port, a second I/O port complementary to the first I/O port, and a second walk-off crystal located between the first I/O port and the second I/O port. The first I/O port includes a light coupling assembly, a first walk-off crystal and a split polarization rotator arranged in order along the optical axis. The light coupling assembly comprises a capillary and two optical fibers. The optical fibers are secured side-by-side in the bore of the capillary. The optical fibers each have a diameter of one half of the diameter of the bore. The cores of the optical fibers are separated from one another in a separation direction by a separation distance. The first walk-off crystal is located to receive the light beams and has a first walk-off direction perpendicular to the separation direction. The split polarization rotator is mounted adjacent the first walk-off crystal and has a positive half and a negative half. The split polarization rotator is located so that the polarization components of the light beams that are deviated by the first walk-off crystal pass through one of the positive half and the negative half, and the polarization components that are not deviated by the first walk-off crystal pass through the other of the positive half and the negative half. The second walk-off crystal has a second walk-off direction perpendicular to the first walk-off direction, and has a walk-off distance equal to the separation distance.

21 Claims, 17 Drawing Sheets

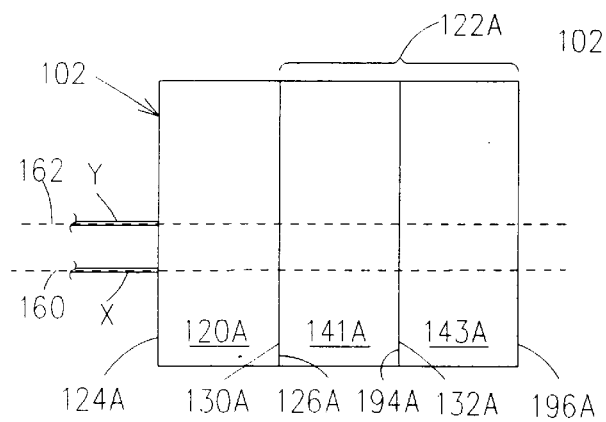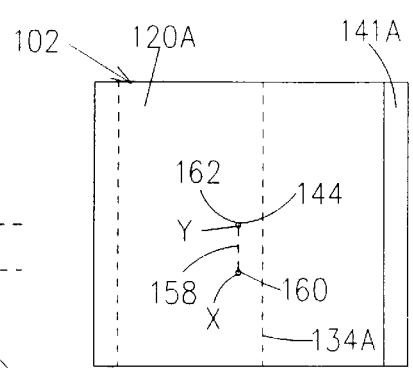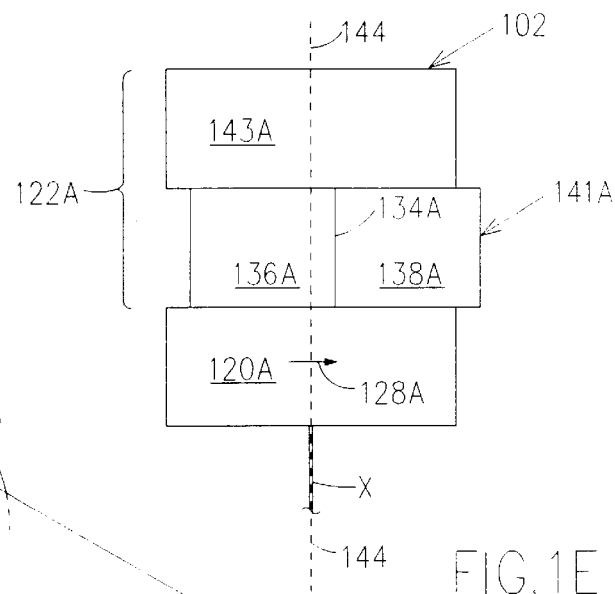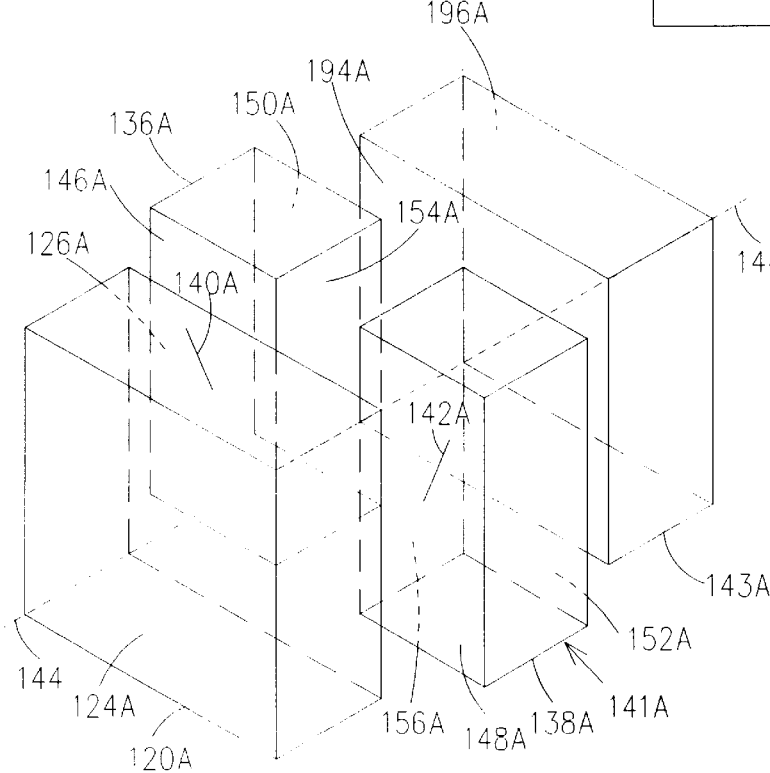

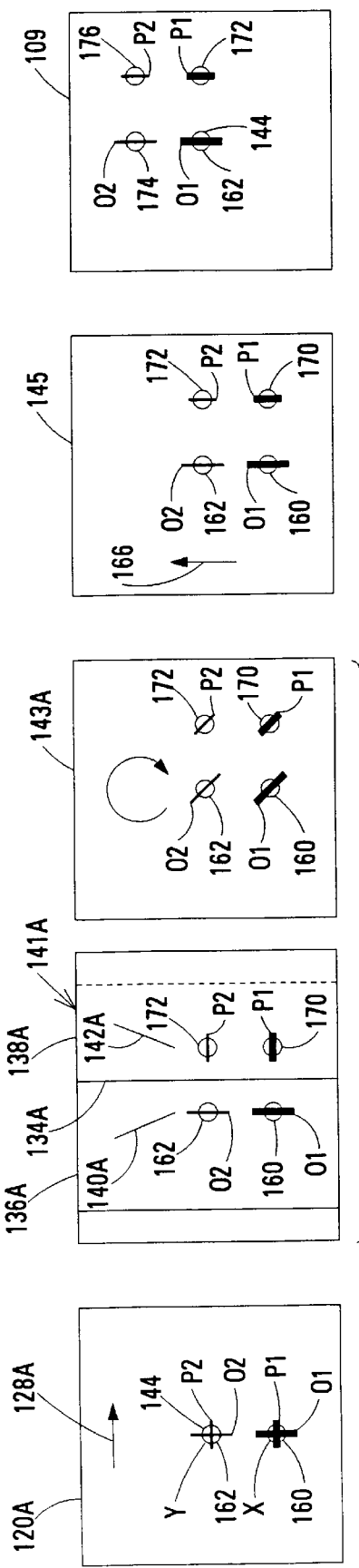
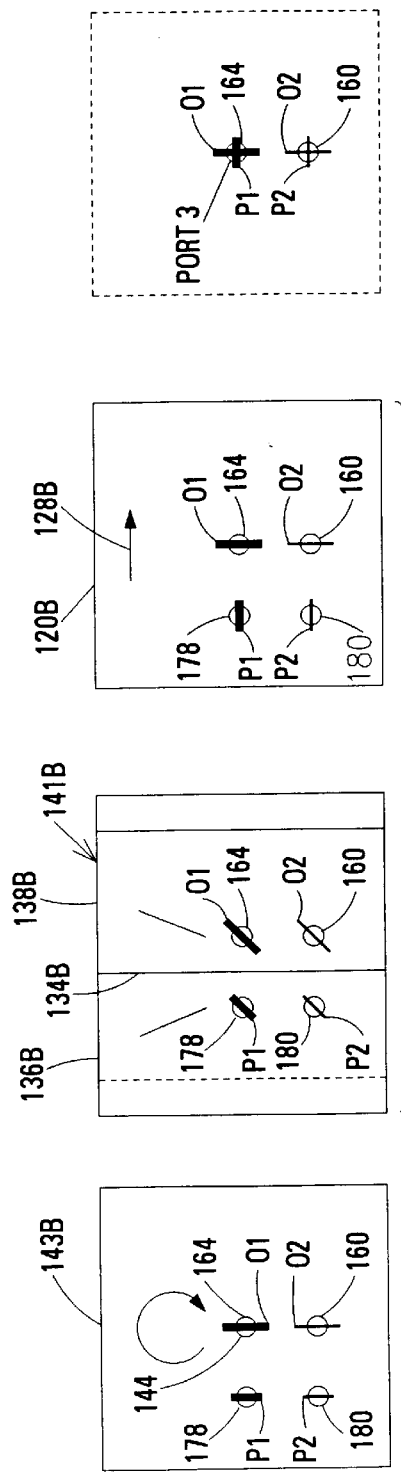

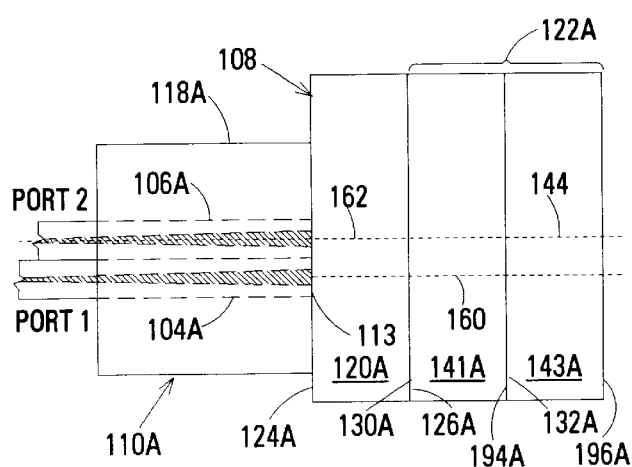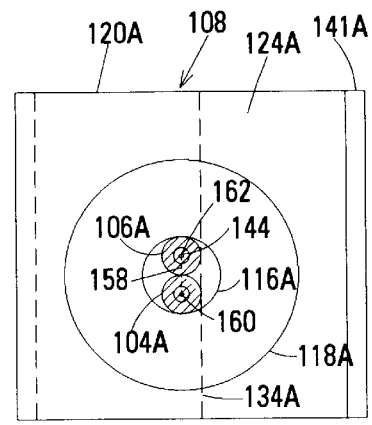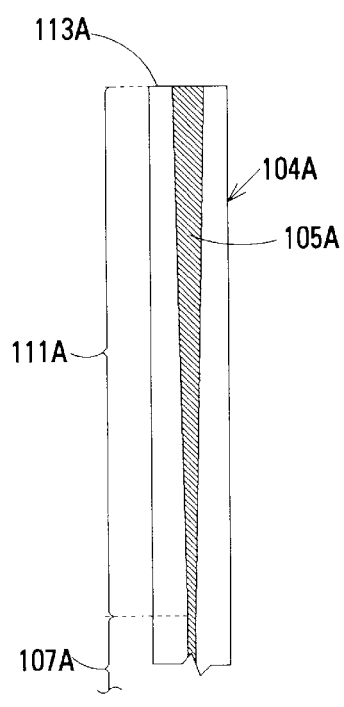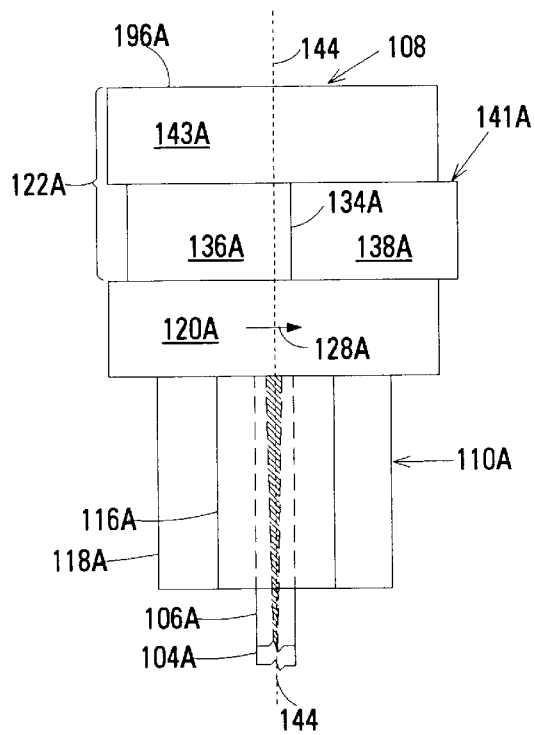
FIG.4A
FIG.4C
FIG.4D
FIG.4B

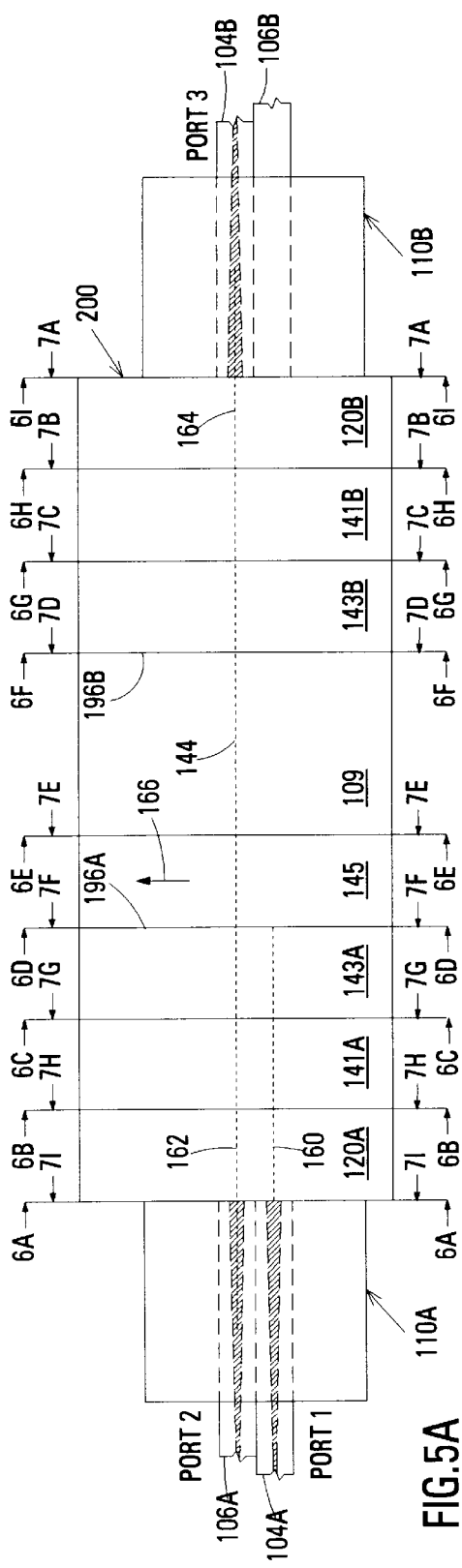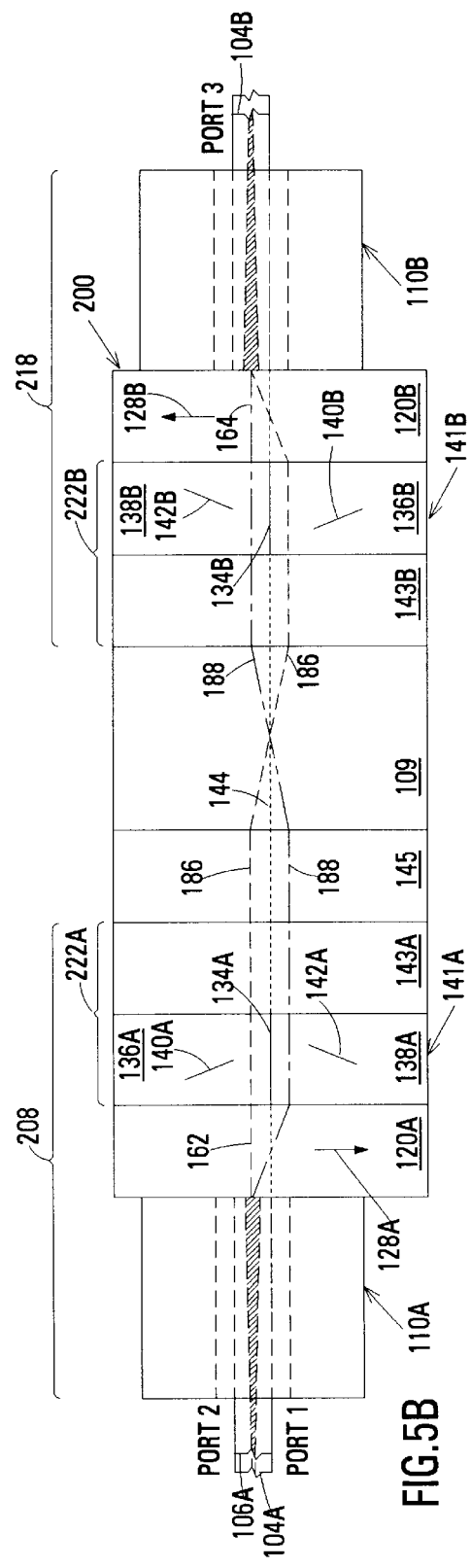
FIG.5A
FIG.5B

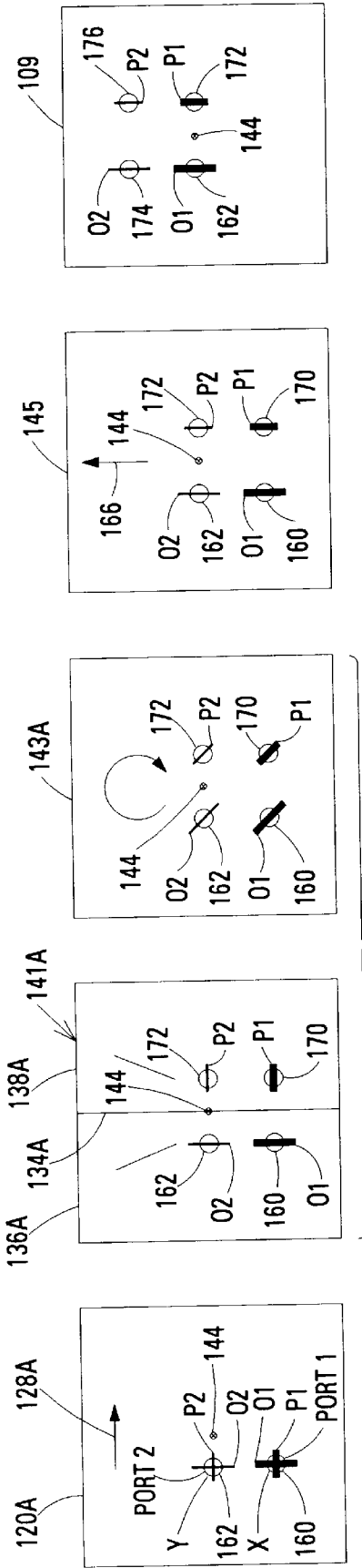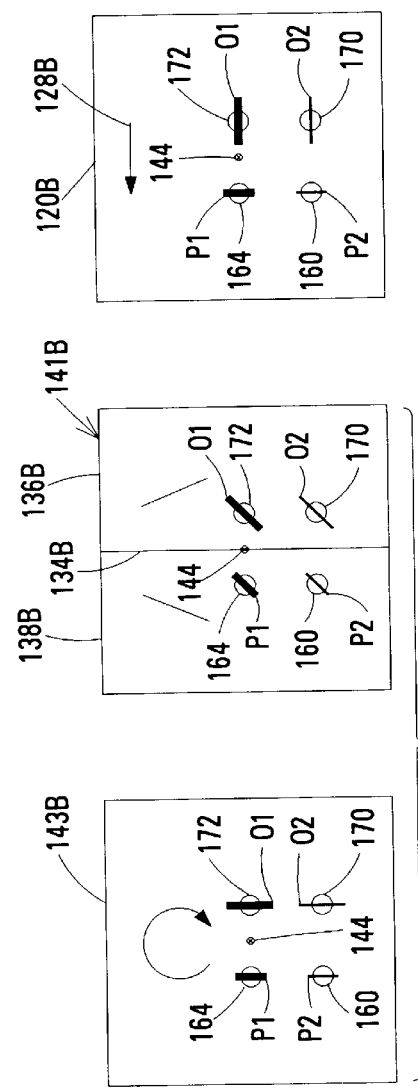

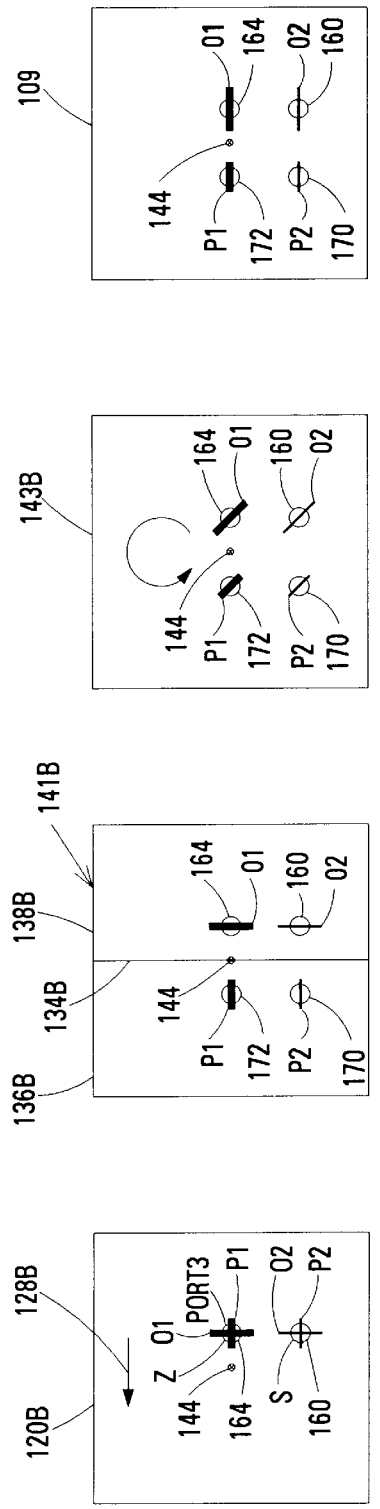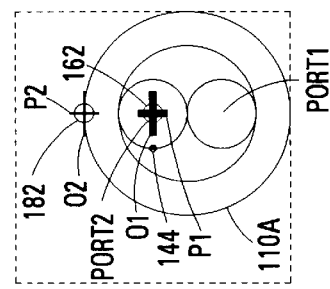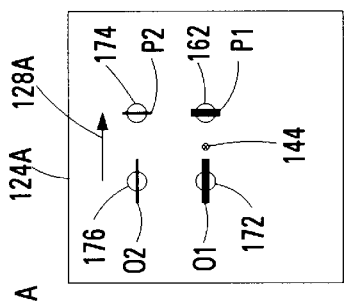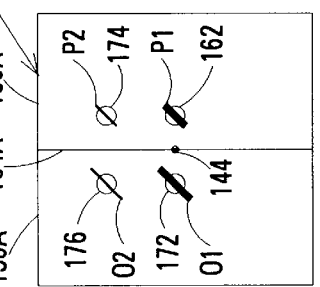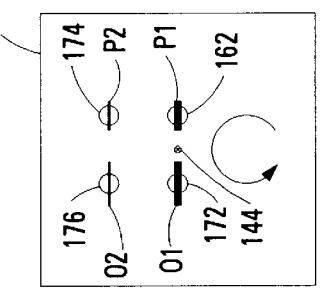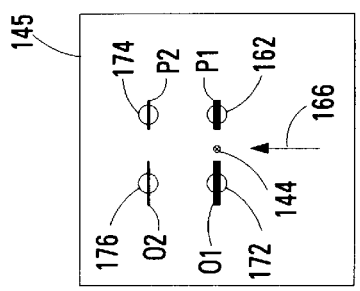

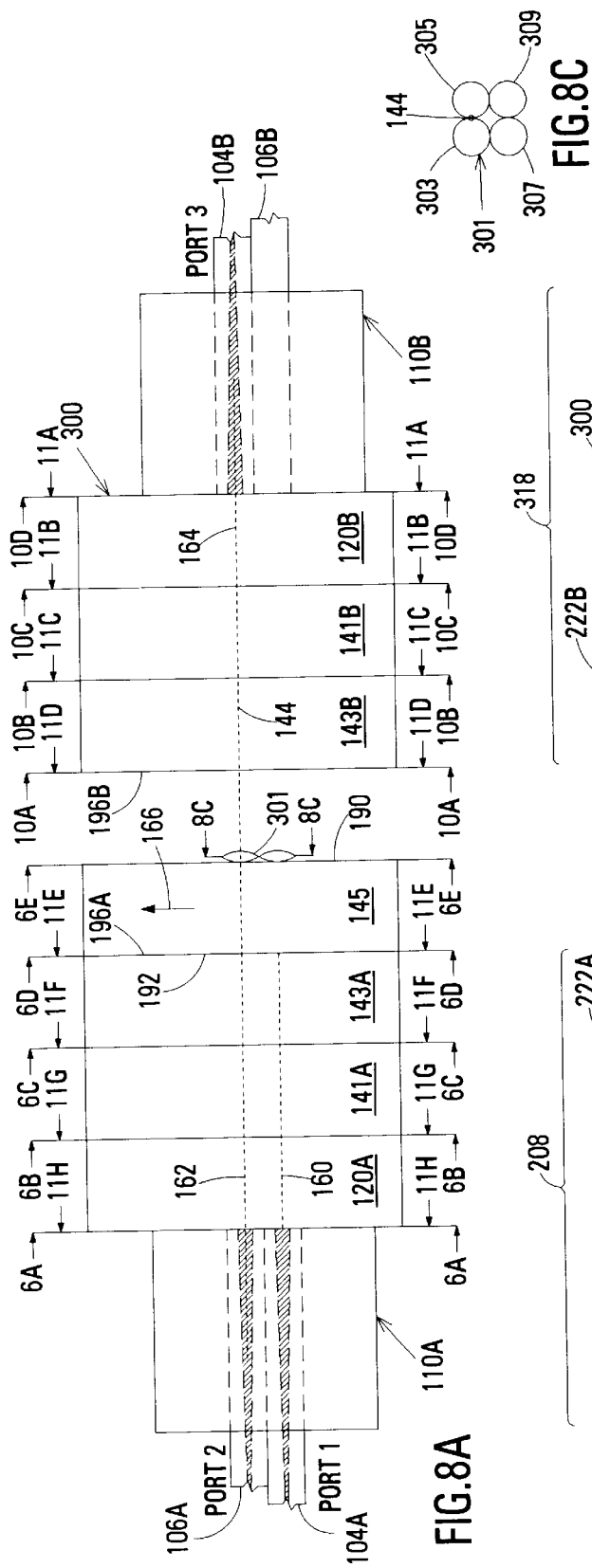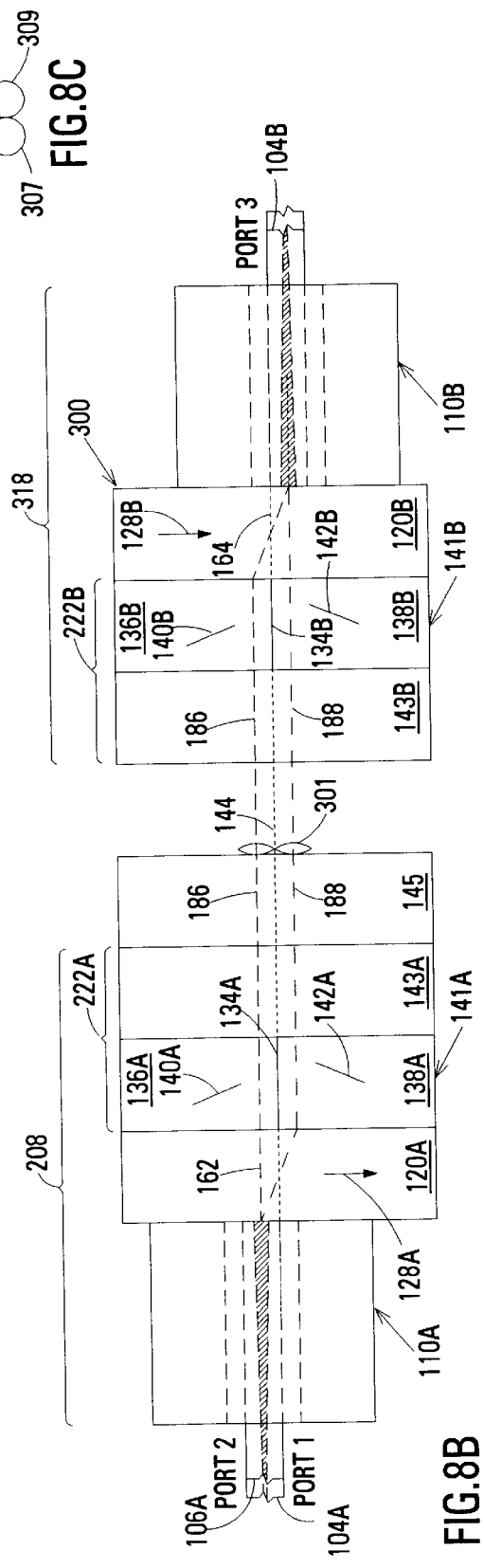

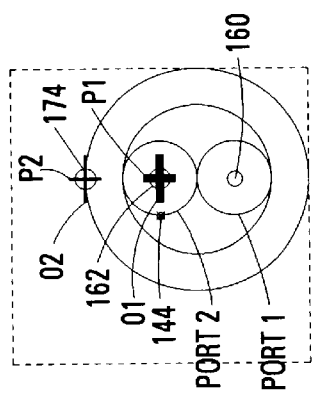
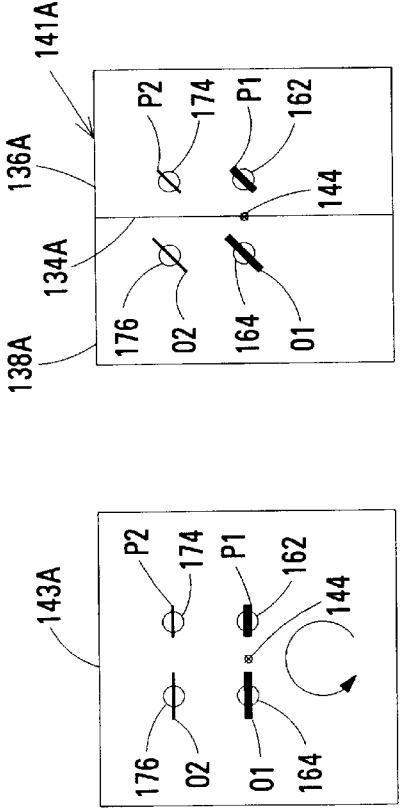
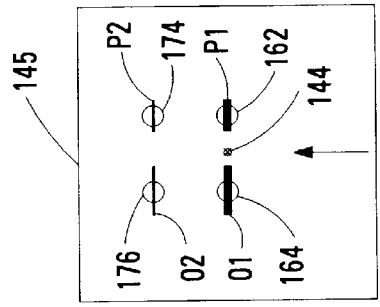
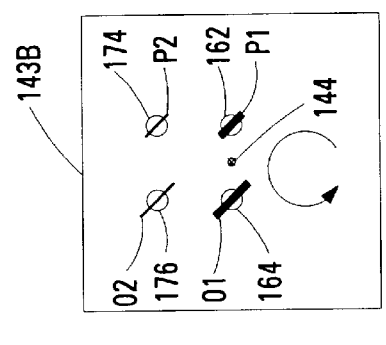
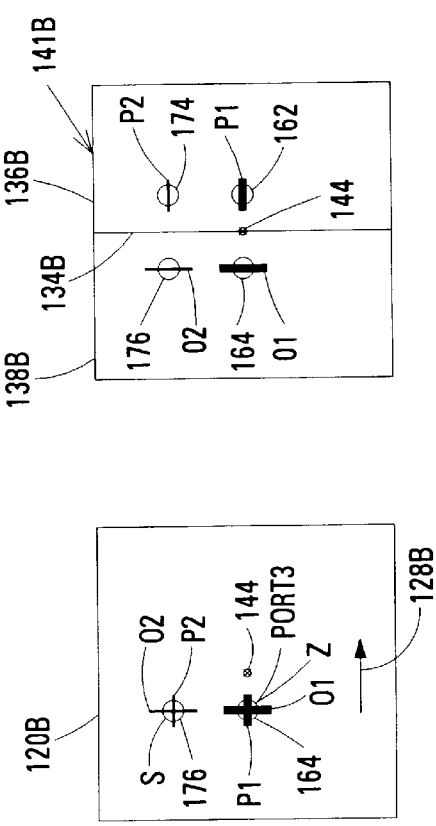
FIG.11D, FIG.11H, FIG.11C, FIG.11G, FIG.11B, FIG.11F, FIG.11A, FIG.11E

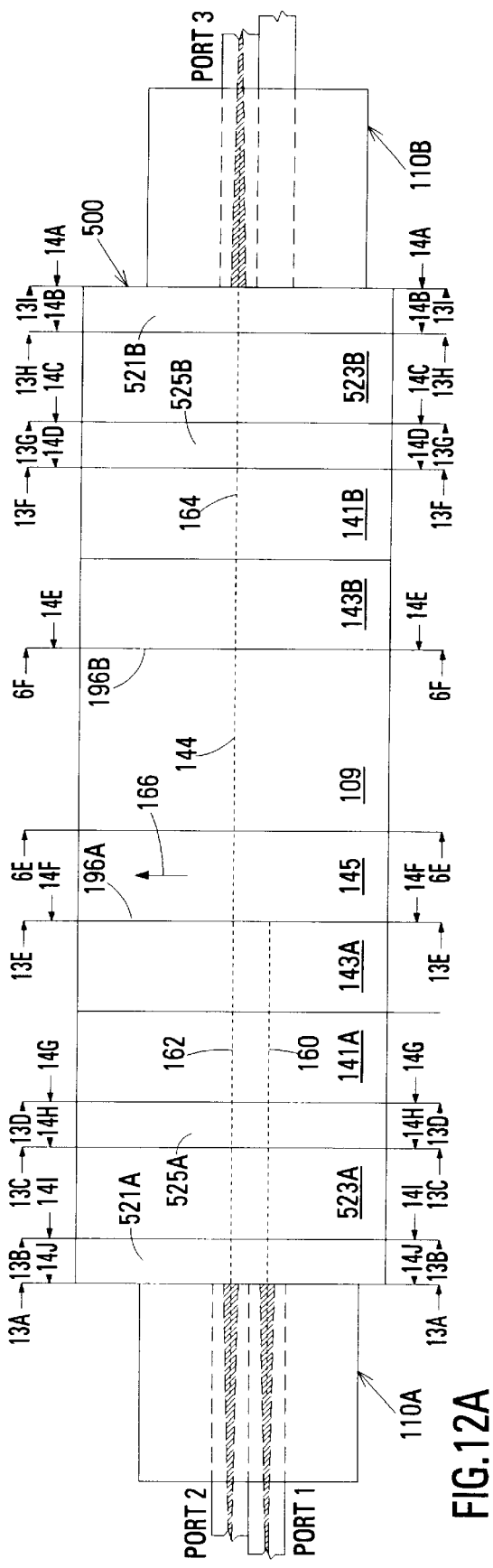
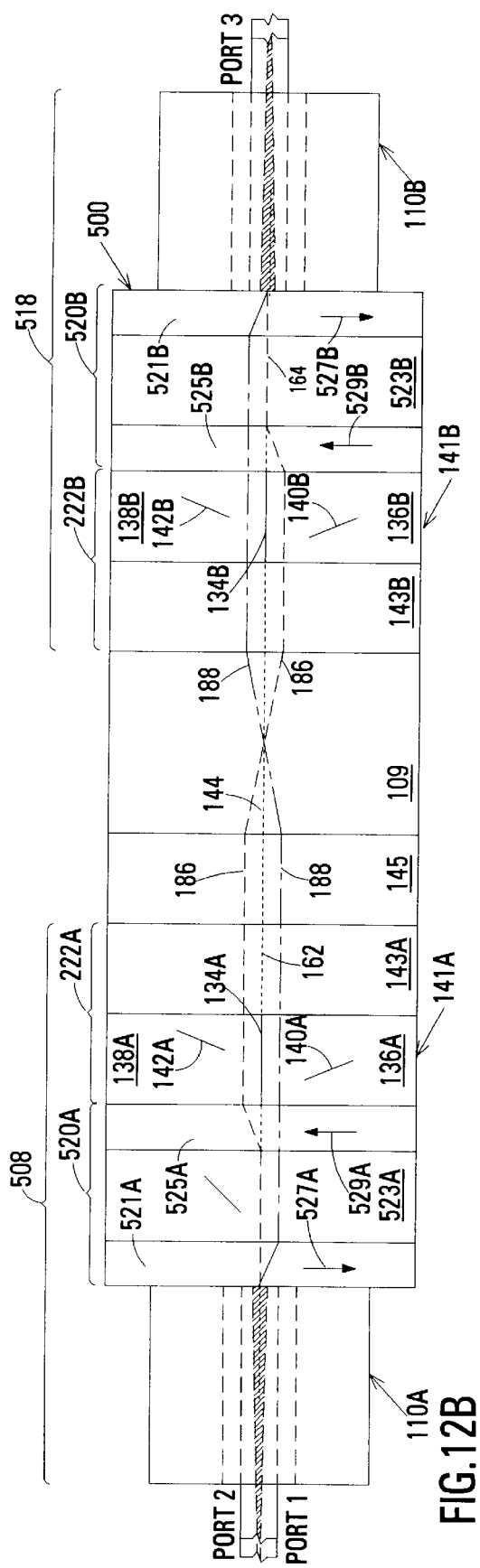
FIG.12A
FIG.12B

COMPACT, LOW CROSSTALK, THREE-PORT OPTICAL CIRCULATOR

FIELD OF THE INVENTION

The present invention relates to compact optical components, in particular to three-port optical circulators.

BACKGROUND OF THE INVENTION

The flexibility of communication networks based on light signals conducted via optical fibres is greatly increased by the availability of optical fibre-compatible optical components such as optical circulators. Optical circulators enable light signals to be routed from one optical fibre to another, and prevent reflected light from returning to the source of the light.

Conventional optical circulators are made of discrete optical elements. As a result, such optical components are bulky and expensive. A substantial portion of the cost of making such optical components arises because the elements of such components are physically large and have to be individually and precisely aligned relative to one another. For example, a recent catalog published by the Fuji Electrochemical Corporation, Tokyo, Japan shows a Model YC-125A three-port optical circulator with dimensions of 43×30×8 mm, excluding the optical fibre connectors. The large size of these components limits the density with which optical fibre switching systems can be built.

In High-Isolation Polarization-Insensitive Optical Circulator for Advanced Optical Communication, 10 J. LIGHTWAVE TECHNOLOGY, 1210–1217 (1992, September) M. Koga and T. Matsumoto describe an optical circulator based on birefringent crystals, Faraday rotators and optically-active rotators. However, in the Koga and Matsumoto optical circulator, the lateral spacing between the input ports is not precisely defined, so the optical circulator divides each light beam into orthogonal polarization components laterally spaced from one another by about 1.2 mm. This requires the use of birefringent crystals some 12 mm thick. Also, the Koga and Matsumoto optical circulator uses optically-active rotators about 15.8 mm thick to rotate the direction of polarization of the polarization components. These large components cause the Koga and Matsumoto optical circulator to be physically large, and make it unsuitable for use in applications in which small size and low cost are important.

In U.S. Pat. No. 5,734,763, assigned to the assignee of the present application, the inventor disclosed a number of different optical components, including optical circulators, based on birefringent walk-off crystals. The linear dimensions of the elements of the optical components disclosed in this patent application are less than one-tenth of those of the elements of conventional optical components, which resulted in these optical components being substantially smaller and lower in cost than conventional optical components.

In the optical circulators disclosed in the inventor's prior application, the fraction of the light beam received at PORT 1 transmitted to PORT 1' is proportional to $\cos^2 \Delta\theta_F$ and the fraction of the light beam received at PORT 2 transmitted to PORT 1', i.e., the crosstalk between PORT 2 and PORT 1', is proportional to $\sin^2 \Delta\theta_F$, where $\Delta\theta_F$ is the rotational alignment error between the walk-off directions of the opposed walk-off crystal pair of the first I/O port and the walk-off directions of the opposed walk-off crystal pair of the second I/O port. To achieve a high transmission factor and low crosstalk requires an accurate rotational alignment between the first and second I/O ports. This increases the manufacturing cost of such optical circulators.

To further increase the flexibility of communication networks based on light signals conducted via optical fibres, it is desirable to increase the density with which optical fibre switching systems can be built, and to reduce substantially the cost of the optical components used in such switching systems. Accordingly, it would be advantageous to have a three-port optical circulator that not only has the considerably smaller size and reduced material cost of the inventor's previously-disclosed optical circulators, but that is also more tolerant of manufacturing alignment errors.

SUMMARY OF THE INVENTION

The invention provides a miniature three-port optical circulator that comprises a first input/output (I/O) port, a second I/O port complementary to the first I/O port, and a second walk-off crystal located between the first I/O port and the second I/O port. The first I/O port includes a light coupling assembly a first walk-off crystal and a split polarization rotator arranged in order along the optical axis. The light coupling assembly comprises a capillary and two optical fibres. The optical fibres are secured side-by-side in the bore of the capillary. The optical fibres each have a diameter of one half of the diameter of the bore. The cores of the optical fibres are separated from one another in a separation direction by a separation distance. The first walk-off crystal is located adjacent the light coupling assembly and has a first walk-off direction perpendicular to the separation direction. The split polarization rotator is mounted adjacent the first walk-off crystal and has a positive half and a negative half The split polarization rotator is located so that the polarization components of the light beams that are deviated by the first walk-off crystal pass through one of the positive half and the negative half, and the polarization components that are not deviated by the first walk-off crystal pass through the other of the positive half and the negative half. The second walk-off crystal has a second walk-off direction perpendicular to the first walk-off direction, and has a walk-off distance equal to the separation distance.

The split polarization rotator may include an opposed half-wave plate pair and a 90° Faraday rotator arranged in either order along the optical axis. The opposed half-wave plate pair includes a positive half-wave plate and a negative half-wave plate attached to one another at a line of attachment disposed substantially parallel to the separation direction of the light beams.

The invention also provides a miniature three-port optical circulator that comprises a first input/output (I/O) port, a second I/O port complementary to the first I/O port, and a second walk-off crystal located between the first I/O port and the second I/O port. The I/O port receives two parallel light beams laterally separated from one another in a separation direction by a separation distance. The first I/O port includes a first walk-off crystal and a first split polarization rotator arranged in order along the optical axis. The first walk-off crystal is located to receive the light beams and has a first walk-off direction perpendicular to the separation direction. The first walk-off crystal comprises a first walk-off crystal element, a second walk-off crystal element, and a 45° half-wave plate arranged in order along the optical axis. The walk-off directions of the first walk-off crystal element and of the second walk-off crystal element are opposite to one another. The first walk-off crystal element and the second walk-off crystal element have substantially equal walk-off distances totalling the walk-off distance of the first walk-off crystal. The 45° half-wave plate is located between the first walk-off crystal element and the second walk-off crystal element. The split polarization rotator has a positive half and a negative half and is located adjacent the first walk-off crystal so that polarization components deviated by the first walk-off crystal pass through a different one of the positive half and the negative half from polarization components not deviated by the first walk-off crystal. The second walk-off crystal has a second walk-off direction perpendicular to the first walk-off direction and has a walk-off distance equal to the separation distance of the light beams.

The invention also provides a miniature three-port optical circulator that comprises a first I/O port, a second I/O port, and a walk-off crystal, called the second walk-off crystal, located between the I/O ports. The first I/O port includes a light coupling element, a first walk-off crystal, and a first split polarization rotator disposed in order along the optical axis. The light coupling element accurately defines a lateral separation distance and separation direction between two light beams and that projects the light beams with a small lateral beam spread. The light coupling element comprises a capillary and two optical fibres. The optical fibres are secured side-by-side in the bore of the capillary. The optical fibres each have a diameter of one half of the diameter of the bore. The first walk-off crystal is located to receive the light beams from the light coupling element, and has a first walk-off direction perpendicular to the separation direction between the light beams. The first walk-off crystal divides each of the light beams into an orthogonal polarization component and a parallel polarization component laterally spaced from one another in the first walk-off direction.

The first split polarization rotator parallelizes the polarization components from the first walk-off crystal to align the directions of polarization of all four polarization components parallel to the separation direction. The first split polarization rotator additionally sets perpendicular to one another initially parallel polarization components perpendicular to one another when such polarization components pass through the first split polarization rotator in the direction opposite to the polarization components passing though the first split polarization rotator from the first walk-off crystal;

The second walk-off crystal has a walk-off direction parallel to the separation direction, and a walk-off distance substantially equal to the lateral separation distance.

The second I/O port includes a second split polarization rotator and a third walk-off crystal arranged in order along the optical axis. The second split polarization rotator sets setting the polarization components from the second walk-off crystal perpendicular to one another. This aligns the directions of polarization of either (a) the orthogonal polarization components, or (b) the parallel polarization components, parallel to the first walk-off direction. The second split polarization rotator additionally parallelizes initially-perpendicular polarization components when such polarization components pass through the second split polarization rotator in a direction opposite to the polarization components from the second walk-off crystal. This aligns the directions of polarization of all four polarization components perpendicular to the separation direction.

The third walk-off crystal is located to receive the polarization components from the second split polarization rotator, and operates to combine one of the orthogonal polarization components and one of the perpendicular polarization components to form an output light beam. The third walk-off crystal has a third walk-off direction parallel to the first walk-off direction.

Finally, the invention provides a method of making a miniature optical circulator. In the method, a walk-off crystal block, a plate pair block, a Faraday rotator block and a perpendicular walk-off crystal block are provided. Each of the blocks have opposed polished surfaces. The plate pair block also has a line of attachment. The walk-off crystal block, plate pair block, Faraday rotator block, and perpendicular walk-off crystal block are stacked on one another with the polished surfaces juxtaposed, and with a film of adhesive between the juxtaposed polished surfaces, to form a component block. The component block is divided along multiple dividing lines oriented in at least one direction perpendicular to the dividing line to form multiple I/O port assemblies.

The plate pair block may be provided by providing an elongate positive half-wave plate block and an elongate negative half-wave plate block. Each half-wave plate block has polished side, top, and bottom surfaces. The positive half-wave plate block has an axis at +22.5° to its polished side surfaces, the negative half-wave plate block has an axis at −22.5° to its polished side surfaces. Each of the half-wave plate blocks is divided in half lengthways to provide two positive half-wave plate halves and, two negative half-wave plate halves. Each of the half-wave plate halves has one polished side surface opposite a rough side surface. Each of the positive half-wave plate halves is attached to one of the negative half-wave plate halves with the polished side surfaces of the half-wave plate halves juxtaposed.

BRIEF DESCRIPTION OF THE DRAWINGS

FIGS. 1C through 1E are respectively front, side and top views of the first I/O port of the first embodiment of the optical circulator according to the invention.

FIG. 1F is an exploded isometric view of the first I/O port of the first embodiment of the optical circulator according to the invention.

FIGS. 2A through 2I illustrate the action of the first embodiment of the optical circulator according to the invention on light passing through the optical circulator in the forward direction.

FIGS. 4A through 4C are respectively top, side and front views of an alternative first I/O port of the first embodiment of the optical circulator according to the invention.

FIG. 4D is a side view showing in more detail the TEC optical fibre used in the alternative first I/O port shown in FIGS. 4A through 4C.

FIGS. 5A and 5B are respectively side and top views of a second embodiment of the optical circulator according to the invention.

FIGS. 6A through 6I illustrate the action of the second embodiment of the optical circulator according to the invention on light passing through the optical circulator in the forward direction.

FIGS. 7A through 7I illustrate the action of the second embodiment of the optical circulator according to the invention on light passing through the optical circulator in the reverse direction.

FIGS. 8A and 8B are respectively side and top views of a third embodiment of an optical circulator according to the invention in which the path-length difference between the polarization components is zero.

FIG. 8C shows a front view of the microlens array used in the embodiment shown in FIGS. 8A and 8B.

FIGS. 11A through 11H illustrate the action of the third and fourth embodiments of the optical circulator according to the invention on light passing through the optical circulators in the reverse direction.

FIGS. 12A and 12B are respectively side and top views of a fifth, fully symmetrical, embodiment of an optical circulator according to the invention.

DETAILED DESCRIPTION OF THE INVENTION

Figure 1A:
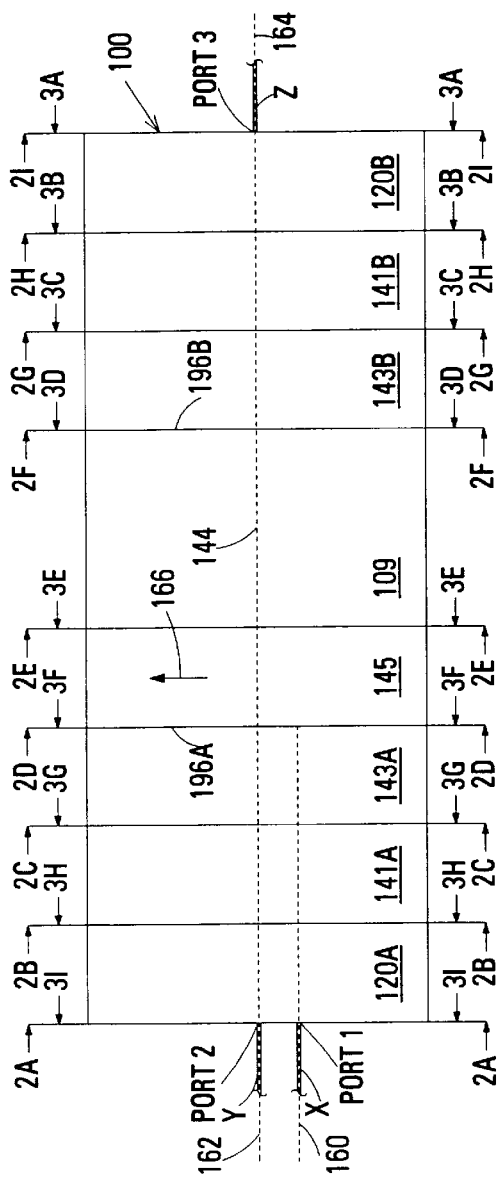
FIGS. 1A and 1B are respectively side and top views of a first embodiment of the optical circulator according to the invention.
Figure 1B:
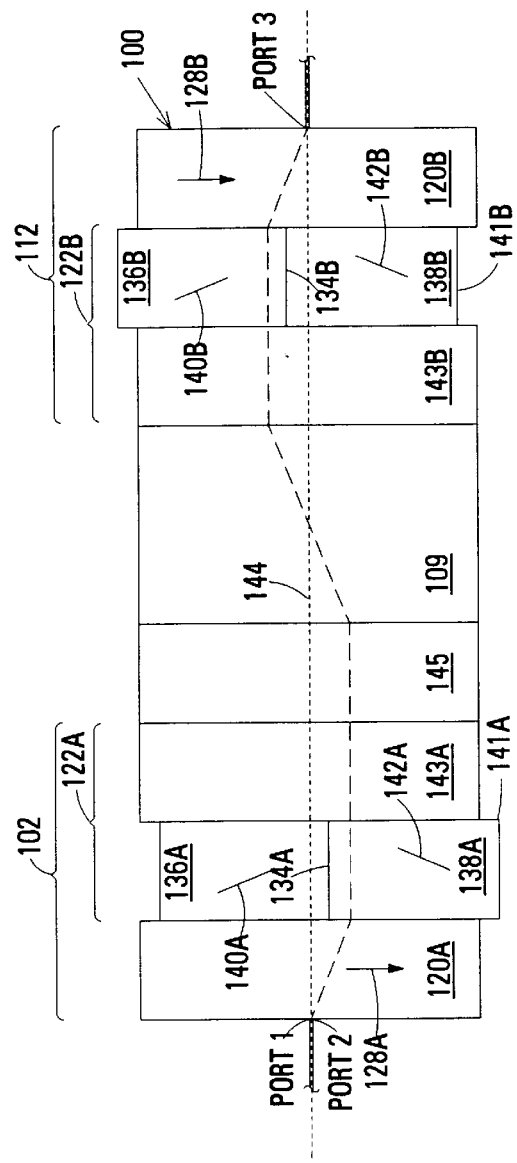

FIGS. 1A and 1B show a side view and a plan view of the general arrangement of a first embodiment 100 of a compact polarization-independent three-port optical circulator according to the invention. The optical circulator 100 includes two complementary compact input/output (I/O) ports 102 and 112 according to the invention, between which are located the perpendicular walk-off crystal 145 and the lens 109. The perpendicular walk-off crystal laterally displaces light passing through the optical circulator in the forward direction relative to the optical axis, but does not laterally displace light passing through the optical circulator in the reverse direction.

In the following description, light passing through the optical circulator 100 from the first I/O port 102 to the second I/O port 112 will be said to pass in the forward direction. Light passing from the second I/O port to the first I/O port will be said to pass in the reverse direction.

The optical axis of the lens 109 defines the optical axis 144 of the optical circulator 100. PORT 2, through which the optical circulator receives the light beam Y, and PORT 3, through which the optical circulator receives the light beam Z, are located on the optical axis. PORT 1, through which the optical circulator receives the light beam X, is displaced laterally from the optical axis by less than about 200 μm in the direction of the lateral axis 158 shown in FIG. 1C.

In the forward direction, the optical circulator 100 receives the two input light beams X and Y via PORT 1 and PORT 2, respectively, transmits the light beam X to PORT 3, and transmits the light beam Y to a location laterally displaced from PORT 3. In the reverse direction, the optical circulator receives the input light beam Z via PORT 3 and transmits the light beam Z to PORT 2.

In the forward direction, the first I/O port 102, operating as an input port, separates the parallel polarization components of the light beams X and Y from the orthogonal polarization components of these light beams, transmits the parallel polarization components to two new spatial locations, each displaced from the optical axes 160 and 162 of the light beams X and Y, and sets the directions of polarization of the polarization components perpendicular to one another, aligned with the walk-off direction of the perpendicular walk-off crystal 145. The perpendicular walk-off crystal laterally displaces both polarization components of both light beams relative to the optical axis 144. This aligns the polarization components of the light beam X received via PORT 1 with the optical axis 164 of PORT 3 and displaces the light beam Y received via PORT 2 to a point laterally displaced from the optical axis of PORT 3. The second I/O port 112 operates as an output port complementarily to the first I/O port to set the directions of polarization of the parallel and orthogonal polarization components of the light beams X and Y perpendicular to one another, and to overlay the polarization components of the light beam X at the location of PORT 3. The second I/O port also overlays the polarization components of the light beam Y, but at a point laterally displaced from the location of PORT 3. As a result, the light beam derived from the light beam Y does not enter PORT 3.

In the reverse direction, the second I/O port 112, operating as an input port, separates the parallel polarization component from the orthogonal polarization component of the light beam Z, laterally displaces the parallel polarization component to a new spatial location, displaced from the optical axis 144, and sets the directions of polarization of the polarization components parallel to one another, aligned perpendicular to the walk-off direction of the perpendicular walk-off crystal 145. The polarization components pass though the perpendicular walk-off crystal without being laterally displaced. The first I/O port 102 operates as an output port, complementary to the second I/O port, to set the directions of polarization of the parallel and orthogonal polarization components of the light beam Z perpendicular to one another, and to overlay the polarization components of the light beam Z to form a light beam. Since the polarization components are not laterally displaced by the perpendicular walk-off crystal, the first I/O port overlays the polarization components of the light beam Z at the location of PORT 2. Any light that enters the second I/O port outside the location of PORT 3 is transmitted through the optical circulator 100, but leaves the first I/O port from a location outside the location of PORT 2. For example, light that enters the optical circulator from the location in the second I/O port where the light beam Y leaves the second I/O port is transmitted to a point having the same lateral displacement from PORT 2 as PORT 1, but on the opposite side of PORT 2 from PORT 1.

The first I/O port 102 of the first embodiment 100 of the optical circulator will now be described in more detail with reference to the front, side, top and exploded isometric views respectively shown in FIGS. 1C, 1D, 1E and 1F. In FIG. 1F, the walk-off crystal 120A, the opposed half-wave plate pair 141A, and the Faraday rotator 143A are exploded along the optical axis 144, and the half-wave plates 136A and 138A are exploded away from the line of attachment 134A.

The second I/O port 112 is similar to the first I/O port, and will be described more detail below. In the following description, corresponding elements of the first I/O port and the second I/O port are indicated by the same reference numeral with the letter "A" added to indicate an element of the first I/O port and the letter "B" added to indicate an element of the second I/O port. This disclosure refers to the same element of both I/O ports using the appropriate reference numeral without an added letter.

The first I/O port 102 is composed of the walk-off crystal 120A and the split polarization rotator 122A arranged along the optical axis 144 in the forward direction of light transmission through the optical circulator 100. The walk-off crystal includes the first face 124A and the second face 126A, opposite the first face. The first face and the second face are preferably the major surfaces of the walk-off crystal. The first face 124A will also be referred to as the first face of the first I/O port. The split polarization rotator is composed of the opposed half-wave plate pair 141A and the Faraday rotator 143A arranged in order along the optical axis in the forward direction of light transmission through the optical circulator. The first face 194A of the Faraday rotator 143A is preferably attached to the second face 132A of the opposed half-wave plate pair 141A. The second face 196A of the Faraday rotator will also be referred to as the second face of the first I/O port 102.

The opposed half-wave plate pair 141A has a first face 130A and a second face 132A, opposite the first face. The first face and the second face are preferably the major surfaces of the opposed half-wave plate pair. The opposed half-wave plate pair is composed of the positive half-wave plate 136A and the negative half-wave plate 138A attached to one another at the line of attachment 134A. In the forward direction of light transmission through the optical circulator 100, the negative half-wave plate 138A is located in the walk-off direction 128A of the walk-off crystal 120A relative to the positive half-wave plate 136A. For example, if the walk-off direction is to the right, the negative half-wave plate is located to the right of the positive half-wave plate.

In this disclosure, light that passes through the positive half-wave plate 136 of the split polarization rotator 122 will be said to pass through the positive half of the split polarization rotator, and light that passes through the negative half-wave plate 138 will be said to pass through the negative half of the split polarization rotator. Light that passes through either half-wave plate 136 or 138 before it passes through the Faraday rotator 143 will be said to pass through the split polarization rotator 122 in the forward direction. Light that passes through the Faraday rotator before it passes through either half-wave plate will be said to pass through the split polarization rotator in the reverse direction.

The action of the split polarization rotators 122A and 122B will now be described by describing the action of the split polarization rotator 122A. The action of the split polarization rotator 122B is the same. As will be described in more detail below, the split polarization rotator 122A rotates the direction of polarization of light passing through it by either 0° or 90°, depending on whether the light passes through the positive half-wave plate 136A or the negative half-wave plate 138A, and depending on whether the light passes through the split polarization rotator in the forward direction or the reverse direction.

The direction of the magnetic field (not shown) applied to the Faraday rotator 143A of the split polarization rotator 122A is chosen so that the Faraday rotator rotates the direction of polarization of light passing through the optical circulator 100, and through the split polarization rotator 122A, in the forward direction clockwise by 45° about the direction of travel of the light. The Faraday rotator is a non-reciprocal device, so rotates the direction of polarization of light passing through the optical circulator, and through the split polarization rotator 122A, in the reverse direction anticlockwise by 45° about the direction of travel of the light.

In the opposed half-wave plate pair 141A, the positive half-wave plate 136A has its optical axis, indicated by the line 140A, aligned at plus 22.5° relative to the line of attachment 134A, and the negative half-wave plate 138A has its optical axis, indicated by the line 142A, aligned at minus 22.5° relative to the line of attachment. In the forward direction, the positive half-wave plate effectively rotates a polarization component that is parallel or perpendicular to the line of attachment by 45° anti-clockwise about the direction of travel of the light. This can be seen by comparing FIGS. 2B (left-hand half) and 2C. FIGS. 2A–2I and 3A–3I will be described in more detail below. The negative half-wave plate effectively rotates a polarization component that is parallel or perpendicular to the line of attachment by 45° clockwise about the direction of travel of the light. This can be seen by comparing FIGS. 2B (right-hand half) and 2C.

The half-wave plates 136A and 138A are reciprocal devices. Hence, in the reverse direction, the positive half-wave plate 136A effectively rotates a polarization component aligned at ±45° to the line of attachment 134A by 45° anticlockwise about the direction of travel of the light. This once more aligns the polarization component perpendicular or parallel, respectively, to the line of attachment 134A. This can be seen by comparing FIGS. 3G (right-hand half) and 3H. The negative half-wave plate 138A rotates a polarization component aligned at ±45° to the line of attachment by 45° clockwise about the direction of travel of the light. This once more aligns the polarization component parallel or perpendicular to the line of attachment. This can be seen by comparing FIGS. 3G (left-hand half) and 3H.

The split polarization rotator 122A combines the above-described effects of the opposed half-wave plate pair 141A and the Faraday rotator 143A. Passing in the forward direction through the positive half of the split polarization rotator leaves unchanged the direction of polarization of a polarization component initially aligned parallel or perpendicular to the line of attachment 134A. The direction of polarization is first rotated 45° anti-clockwise by the positive half-wave plate 136A and is then rotated 45° clockwise by the Faraday rotator. This can be seen in FIGS. 2B (left-hand half, 2C and 2D. Passing in the forward direction through the negative half of the split polarization rotator 122A rotates through 90° the direction of polarization of a polarization component initially aligned parallel or perpendicular to the line of attachment 134A. The direction of polarization is first rotated 45° clockwise by the negative half-wave plate 138A, and is then rotated a further 45° clockwise by the Faraday rotator. This can be seen in FIGS. 2B (right-hand half), 2C and 2D. Thus, passing two initially perpendicular polarization components through the two halves of the split polarization rotator 122A in the forward direction rotates the direction of polarization of one of the polarization components, but not that of the other, through 90°, which aligns the directions of polarization of the polarization components parallel to one another.

Passing in the reverse direction through the positive half of the split polarization rotator 122A rotates through 90° the direction of polarization of a polarization component initially aligned parallel or perpendicular to the line of attachment 134A. The direction of polarization is first rotated 45° anti-clockwise by the Faraday rotator and is then rotated a further 45° anti-clockwise by the positive half-wave plate 136A. This can be seen in FIGS. 3F, 3G (right-hand half) and 3H. Finally, passing in the reverse direction through the negative half of the split polarization rotator 122A does not change the direction of polarization of a polarization component initially aligned parallel or perpendicular to the line of attachment 134A. The direction of polarization is first rotated 45° anti-clockwise by the Faraday rotator, and is then rotated 45° clockwise by the negative half-wave plate 138. This can be seen in FIGS. 3F, 3G (left-hand half) and 3H. Thus, passing two initially parallel polarization components through the halves of the split polarization rotator 122A rotates the direction of polarization of one of the polarization components, but not that of the other, through 90°, which aligns the directions of polarization of the polarization components perpendicular to one another.

The action of the split polarization rotator may be summarized as follows:

| The action of the split polarization rotator may be summarized as follows: | | |
|---|---|---|
| | Direction of Light Travel Through Split Polarization Rotator | |
| | Forward | Reverse |
| Positive Half | 0 | 90 |
| Negative Half | 90 | 0 |

To form the first I/O port 102, the walk-off crystal 120A and the split polarization rotator 122A are attached to one another with the second face 126A of the walk-off crystal contacting the first face 130A of the opposed half-wave plate pair 141A. The walk-off crystal and the split polarization rotator are rotationally oriented so that the walk-off direction 128A of the walk-off crystal is perpendicular to the line of attachment 134A between the half-wave plates 136A and 138A constituting the opposed half-wave plate pair.

In the first I/O port 102, the opposed half-wave plate pair 141A is laterally offset relative to the walk-off crystal 120A and the Faraday rotator 143A. The direction of the offset is the walk-off direction 128A of the walk-off crystal. The offset distance is such that the line of attachment 134A is offset from the axes 160 and 162 of the light beams X and Y by about one-half of the walk-off distance of the walk-off crystal. Consequently, in the first embodiment of the optical circulator 100, in which the optical axis 144 coincides with the axis 162 of the light beam Y, the line of attachment 134A of the split polarization rotator 122A is laterally offset from the optical axis 144 by about one-half of the above-mentioned walk-off distance.

In FIGS. 1A, 1B, and 1E, the walk-off direction of each walk-off crystal is indicated by an arrow showing the walk-off direction for light travelling in the forward direction through the optical circulator 100. For example, in FIGS. 1B and 1E, the walk-off direction of the walk-off crystal 120A for light travelling in the forward direction is from left to right, as indicated by the arrow 128A. However, the walk-off crystal 128A deflects light travelling through the optical circulator 100 in the reverse direction in the direction opposite to that indicated by the arrow, looking in the direction of travel of the light. A similar convention is used in FIGS. 4B, 5A, 5B, 8A, 8B, 9A, 9B, 12A, 12B, which show the structures of the optical circulators according to the invention. In FIGS. 2A–2I, 3A–3I, 6A–6I, 7A–7I, 10A–10D, 11A—11H and 14A–14J, which show the operation of the optical circulators according to the present invention, the arrows show the actual direction in which the walk-off crystals deflect the light.

The opposed half-wave plate pair 141A will be described in greater detail with reference to FIGS. 1C–1F. The opposed half-wave plate pair is composed of the positive half-wave plate 136A and the negative half-wave plate 138A. The half-wave plates 136A and 138A each include a first face 146A and 148A, respectively, and a second face 150A and 152A, respectively, parallel to the first face. The first and second faces are preferably the major faces of the half-wave plates. The first faces 146A and 148A collectively constitute the first face 130A of the opposed half-wave plate pair. The second faces 150A and 152A collectively constitute the second face 132A of the opposed half-wave plate pair. The half-wave plates 136A and 138A also each include an attachment face 154A and 156A, respectively, perpendicular to their first and second faces. The half-wave plates are attached to one another with their respective attachment faces 154A and 156A in contact with one another at the line of attachment 134A. The positive half-wave plate 136A has its optical axis, indicated by the line 140A, aligned at plus 22.5° relative to its attachment face 154A and the line of attachment 134A. The negative half-wave plate 138A has its optical axis, indicated by the line 142A, aligned at minus 22.5° relative to its attachment face 156A and the line of attachment 134A.

The material of the walk-off crystals 120A, 120B and 145 may be rutile (titanium dioxide—$TiO_2$) or yttrium vanadate ($YVO_4$). The preferred material is rutile. The refractive index of rutile is greater than that of $YVO_4$, so rutile has a smaller in vacuo path length for a given walk-off distance. A smaller path length results in less lateral spreading of the polarization components as they pass through the walk-off crystals.

The required walk-off distance of the walk-off crystals 120A and 120B, and hence the thickness of these walk-off crystals, depends on the lateral spread of the polarization components of the light beams X, Y and Z as they pass through the first and second I/O ports 102 and 112. The walk-off crystals must laterally separate the parallel and orthogonal polarization components such that none of the polarization components at its largest lateral spread intersects the line of attachment 134 between the half-wave plates 136 and 138 constituting the opposed half-wave plate pair 122. If any of the polarization components intersects the line of attachment, diffraction effects at the line of attachment and interaction between the polarization components will seriously impair the performance of the optical circulator.

In a practical embodiment, in which the maximum critical radius of the polarization components at the second face 126 of the I/O port 102 or 112 was about 40 $\mu$m, the walk-off crystals 120A and 120B were rutile and had a thickness of about 1.25 mm. This gave a walk-off distance of about 125 $\mu$m. A similar walk-off distance is obtained using a $YVO_4$ walk-off crystal of the same thickness. Such a walk-off distance provides a tolerance of about ±20 $\mu$m on the lateral position of the line of attachment 134 before one of the polarization components will intersect the line of attachment and diffraction effects occur.

The other dimensions of the walk-off crystals 120A and 120B are uncritical. In a practical embodiment, the walk-off crystals 120A and 120B had a length and width of about 1 mm. The dimensions of the opposed half-wave plate pair 141 were similar. The half-wave plates consituting the opposed half-wave plate pair were pieces of zero-order quartz.

The second I/O port 112 is composed of the walk-off crystal 120B and the split polarization rotator 122B arranged on the optical axis so that light travelling in the forward direction through the optical circulator 100 passes through the split polarization rotator first. In the split polarization rotator, the Faraday rotator 143B and the opposed half-wave plate pair 141B are arranged so that light passing through the optical circulator in the forward direction passes through the Faraday rotator first. The opposed half-wave plate pair 141B is displaced laterally from the optical axis 144 in the direction opposite to the walk-off direction 128B of the walk-off crystal 120B by about one-half of the walk-off distance of the walk-off crystal.

With respect to light passing in the forward direction through the the first embodiment 100 of the optical circulator, the walk-off direction 128B of the walk-off crystal 120B is the same as the walk-off direction 128A of the walk-off crystal 120A of the first I/O port 102, the positive half-wave plate 136A of the opposed half-wave plate pair 141B is on the same side of the optical axis as the positive half-wave plate 136B of the opposed half-wave plate pair 141A of the first I/O port, and the direction of rotation of the Faraday rotator 143 is the same in both I/O ports.

Since light passing through the optical circulator 100 in the forward direction passes through the split polarization rotator 122B of the second I/O port in the reverse direction of the split polarization rotator, the positive and negative halves of the split polarization rotator rotate the direction of polarization of polarization components passing through it by 90° and 0°, respectively. Otherwise, the second I/O port is the same as the first I/O port and will therefore not be described further.

To enable light passing through the optical circulator 100 in the forward direction to pass through split polarization rotator 122B of the second I/O port 112 before it passes through the walk-off crystal 120B, the second I/O port is rotated through 180° relative the first I/O port 102 about an axis perpendicular to the optical axis 144. The first I/O port 102 and the second I/O port 112 are then mounted on the optical axis 144 with the second face 196A first I/O port facing the second face 196B second I/O port. The perpendicular walk-off crystal 145 and the lens 109 are located on the optical axis between the first I/O port 102 and the second I/O port 112.

When mounting the I/O ports 102 and 112, the location of the I/O ports relative to the optical axis 144 in the direction perpendicular to the walk-off directions 128 of the walk-off crystals 120 is uncritical unless the dimensions of the elements of the optical circulator perpendicular to the optical axis are comparable with the walk-off distances of the walk-off crystals. In the walk-off directions 128 of the walk-off crystals 120, however, each I/O port should be aligned so that the line of attachment 134 between the half-wave plates 136 and 138 is offset from the optical axis in the walk-off direction by about one-half of the walk-off distance of the walk-off crystal 120. This ensures that the orthogonal polarization components and the parallel polarization components separated by the walk-off crystal are spaced approximately equally from the line of attachment. Finally, the first and second I/O ports are rotationally aligned so that the walk-off direction 128A of the walk-off crystal 120A and the walk-off direction 128B of the walk-off crystal 120B are parallel to one another within a small angular tolerance, and so that both walk-off directions are perpendicular to the lateral axis 158 (shown in FIG. 1C) extending between the axes 160 and 162 of the light beams X and Y.

The perpendicular walk-off crystal 145 is aligned with its walk-off direction 166 parallel to the lateral axis 158, within a small angular tolerance. This makes the walk-off direction of the perpendicular walk-off crystal 145 perpendicular to the walk-off directions 128A and 128B of the walk-crystals 120A and 120B. The perpendicular walk-off crystal 145 has a walk-off distance equal to the length of the lateral axis 158, i.e., equal to the lateral spacing between the light beams X and Y.

Finally, the lens 109 is located between the perpendicular walk-off crystal 145 and the second I/O port 112. A gradient-index (GRIN) lens, as shown in the drawings, is preferred since such a lens is easiest to integrate with the other elements of the optical circulator 100. Alternatively, other types of converging lens can be used. The lens 109 re-converges the polarization components, which diverge as they pass through the optical circulator 100. The focal length of the lens and its spacing from the first faces of the I/O ports are chosen so that the lens forms an image of the first face 124A of the first I/O port 102 on the first face 124B of the second I/O port 112, and vice versa.

The optical circulator 100 is arranged relative to the light beams X, Y and Z such that the light beams X and Y impinge perpendicularly on the first face 124A of the first I/O port 102, and the light beam Z impinges perpendicularly on the first face 124B of the second I/O port 112. The optical circulator is also arranged so that the axes 162 and 164 of the light beams Y and Z, respectively, coincide with the optical axis 144. As noted above, the optical circulator is rotationally oriented relative to the light beams X and Y such that the lateral axis 158 is perpendicular to the walk-off directions 128A and 128B of the walk-off crystals 120A and 120B, respectively.

As will be described in greater detail below, the cost of making the compact optical circulator 100 is substantially reduced compared with making a conventional optical circulator. This is because the optical circulator 100 can be made physically small and can be manufactured using batch processing. The optical circulator is made physically small by minimizing the walk-off distance provided by the walk-off crystals 120A, 145 and 120B. This reduces the thickness, and, hence, the other dimensions, of the walk-off crystals. The walk-off distance is minimized by making the spacing between the light beams X and Y as small as possible. This requires that the light beams be accurately located relative to one another and relative to the lines of attachment 134A and 134B, and also requires that the lateral spread of the light beams be minimized. Moreover, the spacing between the light beams must also be accurately defined relative to the walk-off distance of the perpendicular walk-off crystal 145 to minimize transmission loss in the forward direction.

FIGS. 4A–4D show an embodiment 108 of a modified I/O port in which the direction of, and spacing between, the light beams X and Y is defined by the I/O port itself. The light beams X and Y are coupled to the I/O port using optical fibres whose optical axes are accurately parallel and precisely spaced relative to one another, and that are accurately positioned spatially and rotationally relative to the elements of the I/O port.

A version of the modified I/O port 108 that can be substituted for the first I/O port 102 in the optical circulator 100 shown in FIGS. 1A–1F will now be described with reference to FIGS. 4A–4D. Elements of the modified I/O port 108 corresponding to those of the first I/O port 102 are indicated using the same reference numerals, and will not be described in detail here.

The modified I/O port 108 may readily be adapted so that it can also be substituted for the second I/O port 112 in the optical circulator 100. When used as a second I/O port, the modified I/O port 108 requires only one active optical fibre, the on-axis optical fibre 106. This is because the second I/O port includes only PORT 3, whereas the first I/O port includes PORT 1 and PORT 2. The off-axis optical fibre 104 may be of minimal length. Alternatively, a piece of scrap optical fibre, or a length of glass rod having the same outside diameter as that of the on-axis optical fibre 106 may be used as the off-axis optical fibre when the modified I/O port 108 is used as a second I/O port.

The modified I/O port 108 includes the walk-off crystal 120A and the split polarization rotator 122A, as in the I/O port 102. The first I/O port additionally includes the light coupling assembly 110A that locates the light beams X and Y, transmitted via the optical fibres 104A and 106A, respectively, at a precisely-defined distance and orientation relative to one another. The light coupling assembly also locates the light beams X and Y in a precisely-defined spatial and rotational relationship to the optical axis 144 and the line of attachment 134A between the half-wave plates 136A and 138A constituting the opposed half-wave plate pair 141A.

The optical fibres 104A and 106A are both thermally-diffused, expanded-core (TEC) single-mode optical fibres and are housed in the bore 116A of the capillary 118A. The optical fibre 104A will be described in detail with reference to FIG. 4D. The optical fibre 106A is identical, and will not be described. The optical fibre 104A is a TEC optical fibre in which the core 105A of the fibre has a substantially constant diameter over most of the length of the fibre. A small part of constant-diameter portion of the optical fibre is indicated by the reference numeral 107A. In the expansion region 111A, adjacent the end 113A of the optical fibre that abuts the walk-off crystal 120A, the diameter of the core progressively expands to reach a maximum diameter at the end 113A of the fibre. The expansion factor of the core is typically in the range of 3–5, and the expansion region typically has a length in the range of 4–6 mm.

The expanded core 105A. of the TEC optical fibre 104A reduces the angle at which the light emitted from the end 113A of the fibre spreads laterally compared with a conventional optical fibre. The reduction in the angle at which the light spreads is about equal to the expansion factor. The reduced lateral spreading of the light beam emitted by a TEC optical fibre enables the spacing between the centers of two adjacent TEC optical fibres to be substantially reduced. In the preferred embodiment, the spacing is reduced to the distance corresponding to the outside diameter of the optical fibres. This puts the outside surfaces of the optical fibres in contact one another, as shown in FIG. 4A, for example. Even with this small spacing between the optical fibres, the critical radius of the polarization components of the light beams emitted by the optical fibres as the polarization components pass through the opposed half-wave plate pair 141A is small enough to allow a tolerance of a few tens of microns on the alignment between the optical fibres and the line of attachment 134A. This enables the lateral axis 158 to be mounted a few tens of microns out of alignment with the line of attachment before the polarization components of the light beam emitted by one of the optical fibres intersects the line of attachment 134A. As noted above, minimizing the spacing between the light beams enables the size and cost of the optical circulator to be significantly reduced.

The low lateral spread of the light beam emitted by a TEC optical fibre 104A offers the possibility of eliminating the need to converge the light emitted by the optical fibre on the end of the optical fibre (not shown) corresponding to the optical fibre 104A in the second I/O port. However, even though the lateral beam spread obtained with present TEC optical fibres is small, not converging the light causes a substantial intensity loss. Therefore, it is preferred that the lens 109 be used to converge the light beams, even when the modified I/O port 108 is used. The lens forms an image of the end of the core of the optical fibre 104A on the end of the core of the corresponding optical fibre (not shown) of the second I/O port, and forms an image of the core of the corresponding optical fibre of the second I/O port on the end of the optical fibre 106A of the first I/O port.

In the preferred embodiment, the optical fibres 104A and 106A each have an outside diameter of 125 $\mu$m, the mode field diameter of the constant-diameter region 107A of the core is about 10 $\mu$m, the maximum mode field diameter of the core is about 40 $\mu$m, and the length over which the core expands from its constant diameter to its maximum diameter is about 5 mm. With this arrangement, the radius of the full-width half maximum of each polarization component increases from about 20 $\mu$m at the first face 124A of the walk-off crystal 120A to about 25 $\mu$m at the second face 132A of the opposed half-wave plate pair 141A. This maintains an adequate clearance between the maximum radius of the polarization components and the line of attachment 134A. When the light coupling assembly is centered on the line of attachment, the center of the each polarization component is about 62 $\mu$m from the line of attachment.

The two optical fibres 104A and 106A coupled to the modified I/O port 108 are mounted in the bore 116A of the capillary 118A. The diameter of the bore 118A is a few microns greater than the sum of the outside diameters of the optical fibres 104A and 106A. A bore with this diameter relationship to the outside diameters of the optical fibres accommodates and accurately locates the optical fibres parallel to one another. Inserting the optical fibres, which have a known and accurately-defined outside diameter, into the bore of the capillary, which has a known and precisely-defined diameter, aligns the optical axes 160 and 162 of the optical fibres accurately parallel to one another and precisely defines the distance between the optical axes of the optical fibres. In the preferred embodiment, the capillary 118A has an outside diameter of 1 mm, a length of 10 mm and its bore has a diameter of 254 $\mu$m. The diameter of the bore is four microns larger than the sum of the outside diameters of the optical fibres 104A and 106A.

The light coupling assembly 110A is attached to the first face 124A of the walk-off crystal 120A with the optical axis 162 of the optical fibre 106A centered on the optical axis 144A. This aligns the light beams X and Y relative to the line of attachment 134A such that the orthogonal and parallel polarization components of the light beams enter the opposed half-wave plate pair 141A symmetrically disposed about the line of attachment 134A.

The light coupling assembly 110A is attached to the first face 124A of the walk-off crystal 120A so that it is rotationally oriented such that the lateral axis 158 (FIG. 4C) that interconnects the optical axes 160 and 162 of the optical fibres 104A and 106A, respectively, is perpendicular to the walk-off direction 128A of the walk-off crystal 120A. The rotational alignment of the light coupling assembly is preferably done actively. Both optical fibres are illuminated, and the positions of the four polarization components leaving the second face 196A of the I/O port are checked using suitable magnification. The light coupling assembly is rotated relative to the walk-off crystal until the four polarization components form a perfect rectangle.

The operation of the optical circulator 100 will now be described with reference to FIGS. 2A–2I and 3A–3I. The operation of the optical circulator is the same irrespective of whether the I/O ports 102 and 112 shown in FIGS. 1A–1F are used or whether modified I/O ports similar to the I/O port 108 are used.

FIGS. 2A–2I and 3A–3I show the polarization components of the light beams X, Y, Z and S at various points in the optical circulator 100 indicated by the section lines 2A—2A through 2I—2I and 3A—3A through 3I—3I in FIG. 1A. FIGS. 2A–2I show the polarization components at the indicated points in the optical circulator when the light beams X and Y pass through the optical circulator in the forward direction. FIGS. 3A–3I show the polarization components at the indicated points in the optical circulator when the light beam Z and the spurious light beam S pass through the optical circulator in the reverse direction. In both sets of figures, the views are in the direction in which the light passes through the optical circulator.

FIG. 2A shows the light beams X and Y as they enter the first I/O port 102, i.e., at the first face 124A of the walk-off crystal 120A. The light beam X is shown as having an orthogonal polarization component O1, indicated by a long, thick bar, and a parallel polarization component P1, indicated by a short, thick bar. The light beam Y is shown as having an orthogonal polarization component O2, indicated by a long, thin bar, and a parallel polarization component P2, indicated by a short, thin bar. The orthogonal polarization components O1 and O2 are the polarization components of the light beams X and Y that are perpendicular to the walk-off direction 128A of the walk-off crystal 120A of the first I/O port. The parallel polarization components P1 and P2 are the polarization components of the light beams X and Y that are parallel to the walk-off direction 128A.

In the walk-off crystal 120A, the axis 162 of the light beam Y coincides with the optical axis 144, whereas the axis 160 of the light beam X is laterally displaced from the optical axis in the direction perpendicular to the walk-off direction 128A of the walk-off crystal. The orthogonal polarization components O1 and O2 are perpendicular to the walk-off direction 128A of the walk-off crystal 120A, and so pass through the walk-off crystal without deviation. The parallel polarization components P1 and P2, on the other hand, are parallel to the walk-off direction of the walk-off crystal. The walk-off crystal therefore deviates the parallel polarization components in its walk-off direction. FIG. 2B shows the polarization components as they enter the split polarization rotator 122A from the walk-off crystal 120A.

In the split polarization rotator 122A, the parallel polarization components P1 and P2 are respectively located at the displaced locations 170 and 172 to the right of the optical axis 144. The locations 170 and 172 are respectively displaced relative to the locations 160 and 162 of the orthogonal polarization components O1 and O2 by the walk-off distance of the walk-off crystal 120A in the walk-off direction 128A of the walk-off crystal. As noted above, the split polarization rotator 122A is displaced laterally from the optical axis 144 in the walk-off direction 128A of the walk-off crystal 120A by about one-half of the walk-off distance of the walk-off crystal. Consequently, the orthogonal polarization components O1 and O2 enter the positive half of the split polarization rotator 122A and the parallel polarization components P1 and P2 enter the negative half of the split polarization rotator at points symmetrically disposed about the line of attachment 134A.

The direction of polarization of the orthogonal polarization components O1 and O2 is unchanged by these polarization components passing through the positive half of the split polarization rotator 122A. The direction of polarization of the parallel polarization components P1 and P2 is rotated through 90° by these polarization components passing through the negative half of the split polarization rotator. FIG. 2D shows the polarization components as they enter the perpendicular walk-off crystal 145 from the split polarization rotator 122A. FIG. 2C shows the polarization components as they enter the Faraday rotator 143A from the opposed half-wave plate pair 141A.

The split polarization rotator 122A rotating the direction of polarization of only the parallel polarization components P1 and P2 sets the directions of polarization of all four polarization components parallel to the walk-off direction 166 of the perpendicular walk-off crystal 145. The perpendicular walk-off crystal displaces each of the polarization components in its walk-off direction by its walk-off distance, which is equal to the spacing between the light beams X and Y along the lateral axis 158 (FIG. 1C). Consequently, the perpendicular walk-off crystal laterally displaces the orthogonal polarization component O1 of the light beam X to a position corresponding to the axis 162 of the light beam Y. The perpendicular walk-off crystal also laterally displaces the parallel polarization component P1 of the light beam X to the displaced location 172. Finally, the perpendicular walk-off crystal displaces the orthogonal polarization component O2 and the parallel polarization component P2 of the light beam Y to the displaced locations 174 and 176, respectively. The displaced location 174 lies on an extension of the lateral axis 158 (see FIG. 1C) and is displaced from the axis 162 by the walk-off distance of the perpendicular walk-off crystal 145. The displaced location 176 is displaced from the axis 162 by the combined walk-off distances of the walk-off crystals 145 and 120A. The perpendicular walk-off crystal does not change the directions of polarization of the polarization components. FIG. 2E shows the polarization components as they enter the lens 109 from the perpendicular walk-off crystal.

The lens 109 inverts the positions of the polarization components O1, P1, O2 and P2 about the optical axis 144. Since the orthogonal polarization component O1 lies on the optical axis, the lens leaves the position of this polarization component unchanged. The axis 164 of PORT 3 coincides with the optical axis, so the lens leaves the orthogonal polarization component O1 aligned with PORT 3. The lens inverts the position of the orthogonal polarization component O2 about the optical axis to a position corresponding to the axis 160 of the light beam X, and inverts the positions of the parallel polarization components P1 and P2 and the light beams X and Y, respectively, about the optical axis to the displaced locations 178 and 180. The displaced location 178 is displaced from the optical axis 144 in the direction opposite to the walk-off direction of the walk-off crystal 120A by the walk-off distance of this walk-off crystal. The displaced location 180 is displaced from the optical axis 144 in the direction opposite to the combined walk-off directions of the walk-off crystals 120A and 145 by the combined walk-off distances of these walk-off crystals.

FIG. 2F shows the polarization components as they enter the second I/O port 112 from the perpendicular walk-off crystal 145. The polarization components enter the opposed half-wave plate pair 122B, which is laterally offset from the optical axis in the direction opposite to the walk-off direction of the walk-off crystal 120B. This aligns the orthogonal polarization components O1 and O2 with the negative half of the split polarization rotator 122B, and aligns the parallel polarization components P1 and P2 with the positive half of the split polarization rotator. The orthogonal polarization components and the parallel polarization components are symmetrically disposed about the line of attachment 134B of the opposed half-wave plate pair 141B.

The polarization components passing through the optical circulator 100 in the forward direction pass through the split polarization rotator 122B of the second I/O port in the reverse direction of the split polarization rotator. Consequently, the direction of polarization of the orthogonal polarization components O1 and O2 is unchanged by the polarization components passing through the negative half of the split polarization rotator 122B. The direction of polarization of the parallel polarization components P1 and P2 is rotated through 90° by the polarization components passing through the positive half of the split polarization rotator.

FIG. 2H shows the polarization components as they enter the walk-off crystal 120B from the split polarization rotator 122B. The split polarization rotator rotating the direction of polarization of the parallel polarization components P1 and P2 sets the directions of polarization of the parallel polarization components perpendicular to their respective orthogonal polarization components O1 and O2, and aligns the parallel polarization components parallel to the walk-off direction 128B of the walk-off crystal 120B. FIG. 2G shows the polarization components as they enter the opposed half-wave plate pair 141B from the Faraday rotator 143B.

The walk-off crystal 120B deflects the parallel polarization components P1 and P2 by its walk-off distance in its walk-off direction 128B. The walk-off crystal passes the orthogonal polarization components O1 and O2 without deflecting them. The walk-off distance of the walk-off crystal 120B is such that the parallel polarization component P1 of the light beam X is overlaid on the orthogonal polarization component O1 of the light beam X at the location of the axis 164 of PORT 3, and the parallel polarization component P2 of the light beam Y is overlaid on the parallel polarization component O2 of the light beam Y at the location of the axis 160, laterally displaced from PORT 3. Thus, only the light beam X entering the optical circulator via PORT 1 is transmitted to PORT 3. The light beam Y entering the optical circulator via PORT 2 is transmitted to a point laterally displaced from PORT 3, and so does not enter PORT 3.

In the preferred embodiment, the parallel polarization components P1 and P2 enter the walk-off crystal 128B laterally displaced from the orthogonal polarization components O1 and O2, respectively, by a distance equal to the walk-off distance of the walk-off crystal 128A. The respective polarization components are overlaid by making the walk-off distance of the walk-off crystal 128B equal to that of the walk-off crystal 128A.

The operation of the optical circulator 100 in the reverse direction will now be described with reference to FIGS. 3A–3I. These figures show the polarization components of the light beam Z and the spurious light beam S at various points in the optical circulator 100 indicated by the section lines 3A—3A through 3I—3I in FIG. 1A. The views are all in the direction in which the light passes through the optical circulator. The spurious light beam S enters the second I/O port 112 of the optical circulator aligned with the axis 160 of the PORT 1 of the first I/O port, i.e., at the location in the second I/O port from which the light beam Y leaves the optical circulator in the forward direction.

Figure 3D:
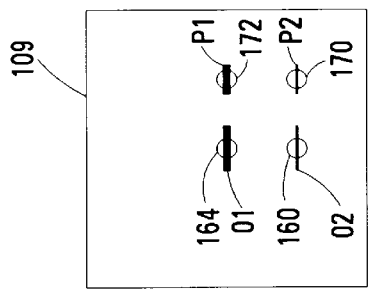
FIGS. 3A through 3I illustrate the action of the first embodiment of the optical circulator according to the invention on light passing through the optical circulator in the reverse direction.
Figure 3C:
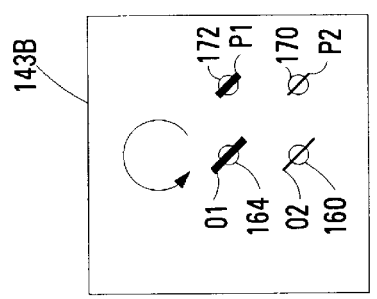
Figure 3B:
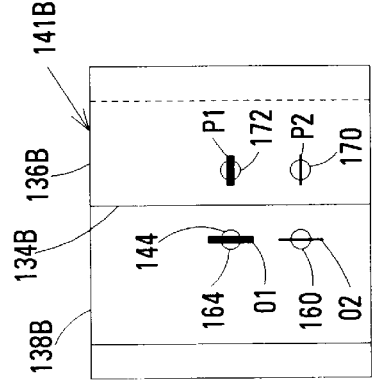
Figure 3A:
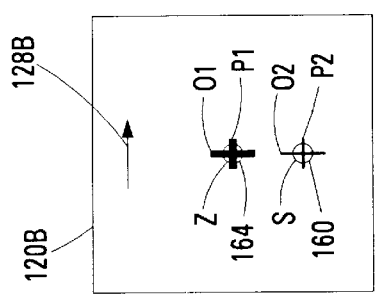
Figure 3I:
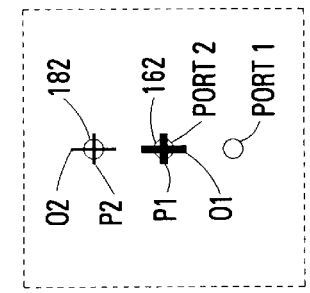

FIG. 3A shows the light beams Z and S as they enter the second I/O port 112. The light beam Z enters the second I/O port at PORT 3, i.e., along the axis 164, and is shown as having an orthogonal polarization component O1, indicated by a long, thick bar, and a parallel polarization component P1, indicated by a short, thick bar. The spurious light beam enters the second I/O port along the axis 160, and is shown as having an orthogonal polarization component O2, indicated by a long, thin bar, and a parallel polarization component P2, indicated by a short, thin bar.

In the walk-off crystal 120B, the orthogonal polarization components O1 and O2 are perpendicular to the walk-off direction 128B of the walk-off crystal 120B, and so pass through the walk-off crystal without deviation. The parallel polarization components P1 and P2 are parallel to the walk-off direction of the walk-off crystal, and so are deviated by the walk-off crystal. FIG. 3B shows the polarization components as they enter the split polarization rotator 122B from the walk-off crystal 120B.

The parallel polarization components P1 and P2 are respectively located at the displaced locations 172 and 170 to the right of the optical axis 144 as they enter the split polarization rotator 122B. The locations 172 and 170 are displaced relative to the locations 164 and 160 of the orthogonal polarization components O1 and O2 by the walk-off distance of the walk-off crystal 120B in the walk-off direction 128B of the walk-off crystal. As noted above, the opposed half-wave plate pair 141B is displaced laterally from the optical axis 144 in the walk-off direction 128B of the walk-off crystal 120B by a distance of about one-half of the walk-off distance of the walk-off crystal. This causes the orthogonal polarization components to enter the negative half of the split polarization rotator, and the parallel polarization components enter the positive half of the split polarization rotator, at locations symmetrically disposed about the line of attachment 134B of the opposed half-wave plate pair 141B.

The polarization components passing through the optical circulator 100 in the reverse direction pass through the split polarization rotator 122B of the second I/O port in the forward direction of the split polarization rotator. Consequently, the direction of polarization of the parallel polarization components P1 and P2 is unchanged by these polarization components passing through the positive half of the split polarization rotator. The direction of polarization of the orthogonal polarization components O1 and O2 is rotated through 90° by these polarization components passing through the negative half of the split polarization rotator.

FIG. 3D shows the polarization components as they enter the lens 109 from the second I/O port 112. The split polarization rotator 122B rotating the direction of polarization of the orthogonal polarization components O1 and O2 sets the directions of polarization of all four polarization components perpendicular to the walk-off direction 166 of the perpendicular walk-off crystal 145. FIG. 3C shows the polarization components as they enter the Faraday rotator 143B from the opposed half-wave plate pair 141B.

The lens 109 inverts the positions of the polarization components O1, P1, O2 and P2 about the optical axis 144. Since the orthogonal polarization component O1 of the light beam Z lies on the optical axis 144, the lens leaves the position of this polarization component unchanged. The axis 162 of PORT 2 coincides with the optical axis, so the lens leaves this polarization component aligned with PORT 2.

The lens inverts the positions of the orthogonal polarization component O2 and the parallel polarization components P1 and P2 to the displaced locations 182, 184 and 186, respectively. FIG. 3E shows the polarization components as they enter the perpendicular walk-off crystal 145 from the lens.

Since the directions of polarization of all four polarization components O1, P1, O2 and P2 are perpendicular to the walk-off direction 166 of the perpendicular walk-off crystal 145, all four polarization components pass through the perpendicular walk-off crystal without any change in their positions or directions of polarization. FIG. 3F shows the polarization components as they enter the first I/O port 102 from the perpendicular walk-off crystal.

The orthogonal polarization components and the parallel polarization components enter the first I/O port 102 aligned with the positive half and the negative half, respectively, of the split polarization rotator 122A, and disposed symmetrically about the line of attachment 134A. The polarization components passing through the optical circulator 100 in the reverse direction pass through the split polarization rotator 122A of the first I/O port 108 in the reverse direction of the split polarization rotator. Consequently, the direction of polarization of the orthogonal polarization components O1 and O2 is rotated through 90° by the polarization components passing through the positive half of the split polarization rotator. The direction of polarization of the parallel polarization components P1 and P2 is unchanged by the polarization components passing through the negative half of the split polarization rotator 122A.

Figure 3H:
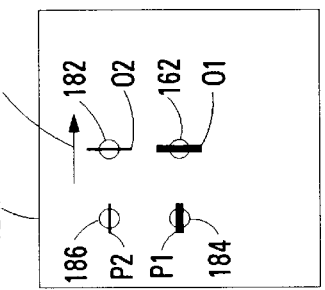
Figure 3G:
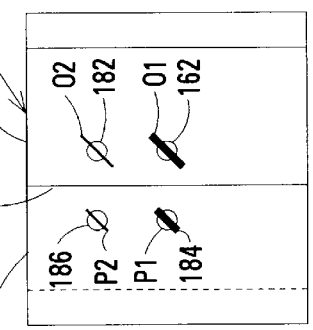
Figure 3F:
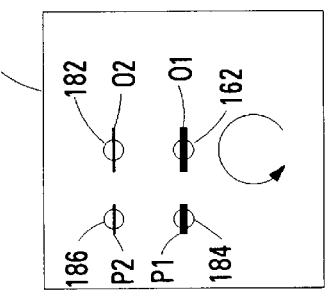
Figure 3E:
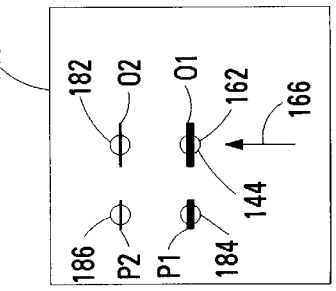

FIG. 3H shows the polarization components as they enter the walk-off crystal 120A from the split polarization rotator 122A. The split polarization rotator rotating the direction of polarization of the orthogonal polarization components O1 and O2 sets the directions of polarization of the orthogonal polarization components perpendicular to those of their respective parallel polarization components P1 and P2. The parallel polarization components remain parallel to the walk-off direction 128A of the walk-off crystal 120A. FIG. 3G shows the polarization components as they enter the opposed half-wave plate pair 141A from the Faraday rotator 143A.

The walk-off crystal 120A deflects the polarization components P1 and P2 by its walk-off distance in the direction of its walk-off direction 128A, and passes the orthogonal polarization components O1 and O2 without deflecting them. The relationship between the walk-off distances of the walk-off crystals 120A and 120B is such that the parallel polarization component P1 of the light beam Z is overlaid on the orthogonal polarization component O1 of the light beam Z at the location of the axis 162, i.e., at PORT 2, and the parallel polarization component P2 of the light beam S is overlaid on the parallel. polarization component O2 of the light beam S at the displaced location 182. The displaced location 182 is laterally displaced from both PORT 1 and PORT 2, so only the light beam Z entering the optical circulator via PORT 3 is transmitted to PORT 2. The spurious light beam S entering the optical circulator at the location corresponding to the exit location of the light beam Y in the forward direction is transmitted to neither PORT 1 nor PORT 2.

When light passes through the optical circulator 100 in the forward direction, the optical circulator should ideally transmit 100% of the light beam X and 0% of light beam Y to PORT 3, i.e., the optical circulator should have a transmission factor of unity and cross-talk of zero. However, the transmission factor and crosstalk of a practical optical circulator are degraded by errors in the components of the I/O ports, and by angular misalignment between the I/O ports and the perpendicular walk-off crystal 145. The transmission factor and crosstalk are degraded by the walk-off directions of the walk-off crystals 120A and 120B not being exactly perpendicular to the walk-off direction of the perpendicular walk-off crystal 145, and by the split polarization rotators 122A and 122B not rotating the directions of polarization of the polarization components by exactly 0° or 90°.

In the forward direction, the above-mentioned errors in the first I/O port 102 align the direction of polarization one or more of the polarization components O1, P1, O2 and P2 at a non-zero angle $\Delta\theta_1$ to the walk-off direction 166 of the perpendicular walk-off crystal 145. The non-zero angle $\Delta\theta_1$ between the direction of a polarization component and the walk-off direction 166 results in the polarization component having a component perpendicular to the walk-off direction. This component, which will be called the error component of the polarization component, is not deflected by the perpendicular walk-off crystal. The amplitude of this component is proportional to $\sin^2\Delta\theta_1$. A non-zero angle between the directions of polarization of the polarization components O1 and P1 of the light beam X and the walk-off direction 166 of the perpendicular walk-off crystal 145 degrades the transmission factor of the optical circulator 100 with respect to the light beam X. The degradation is proportional to $\cos^2\Delta\theta_1$.

The perpendicular walk-off crystal 145 does not deflect the error components of the polarization components O1 and P1 of the light beam X from the locations 160 and 170 to the locations 162 and 172, respectively. Consequently, part of the light beam X, i.e., the error components, is not deflected to the locations 162 and 172 whence the light beam X is transmitted to PORT 3. Thus, the intensity of the light beam X at PORT 3 is reduced.

A non-zero angle between the directions of polarization of the polarization components O2 and P2 of the light beam Y and the walk-off direction 166 of the perpendicular walk-off crystal 145 also degrades the cross-talk of the optical circulator 100. The perpendicular walk-off crystal does not deflect the error components of the polarization components of the light beam Y from the locations 162 and 172 to the locations 174 and 176, respectively. Instead, the error components remain at the locations 162 and 172, where they are mixed with the polarization components of the light beam X deflected from the locations 160 and 170. Thus, the polarization components of the light beam X entering the second I/O port from the perpendicular walk-off crystal 145 include the error components of the light beam Y.

Errors in the first I/O port 102 reduce the transmission factor of, and increase cross-talk in, the polarization components of the light beam X entering the second I/O port 112 from the perpendicular walk-off crystal 145. However, the transmission factor and cross-talk of the optical circulator 100 with respect to the light beam X are not determined solely by the transmission factor and cross-talk of the first I/O port. The second I/O port 112 decreases the transmission factor by a small amount and decreases the cross-talk of the optical circulator 100 compared with the transmission factor and cross-talk at the output of the perpendicular walk-off crystal.

The second I/O port 112 reduces the cross-talk at the output of the perpendicular walk-off crystal 166 by attenuating the error components $E_{O2}$ and $E_{P2}$ of the light beam Y in the light beam X. When the split polarization rotator 122B of the second I/O port rotates the direction of polarization of the polarization components O1 and P1 of the light beam X, it also rotates the error components $E_{O2}$ and $E_{P2}$ in the polarization components O1 and P1, respectively. Consequently, the error components are aligned parallel and perpendicular, respectively, to the walk-off direction 128B of the walk-off crystal 120B. The walk-off crystal 120B deflects the polarization component P1, which aligns P1 with PORT 3. However, the walk-off crystal does not deflect the error component $E_{P2}$, so the error component $E_{P2}$ does not enter PORT 3. The walk-off crystal 120B passes the orthogonal polarization component O1 without deflecting it, which keeps the orthogonal polarization component aligned with PORT 3. However, the walk-off crystal deflects the error component $E_{O2}$ away from PORT 3, so the error component $E_{O2}$ does not enter PORT 3.

By similarly rotating the direction of polarization of the error components of the light beam X, the second I/O port 112 changes the transmission factor with respect to the light beam X.

In a practical embodiment of the optical circulator 100, the components of second I/O port 112 are subject to the same types of errors as the corresponding components of the first I/O port 102. Consequently, unless the error components in the orthogonal and parallel polarization components are respectively exactly parallel and perpendicular to the walk-off direction 128B of the walk-off crystal 120B, the second I/O port will transmit a fraction of the error component in each polarization component to PORT 3. The fraction of the error component transmitted to PORT 3 depends on the angle $\Delta\theta_2$ between the direction of polarization of the error component and the direction parallel or perpendicular to the walk-off direction 128B.

The overall transmission factor of the optical circulator 100, i.e., the fraction of the light beam X transmitted to PORT 3, is given by: $I_X \cos^2 \Delta\theta_1 \cos^2 \Delta\theta_2$, where $I_X$ is the intensity of the light beam X. The cross-talk of the optical circulator 100, i.e., the fraction of the light beam Y transmitted to PORT 3, is given by: $I_Y \sin^2 \Delta\theta_1 \sin^2 \Delta\theta_2$, where $I_Y$ is the intensity of the light beam Y. The additional attenuation of crosstalk by the second I/O port provides acceptable cross-talk performance despite a substantial angular alignment errors between the polarization components and the walk-off directions of the perpendicular walk-off crystal 145 and the walk-off crystal 120B. For example, with $\Delta\theta_1$ and $\Delta\theta_2$ in the range of $\pm 2°$, the crosstalk will be below $-60$ dB, and with $\Delta\theta_1$ and $\Delta\theta_2$ in the range of $\pm 5°$, the crosstalk will be below $-40$ dB.

The transmission factor of the optical circulator 100 for the light beam Z in the reverse direction, and the crosstalk from the spurious light beam S into PORT 2 depend similarly on the angular misalignments $\Delta\theta_1$ and $\Delta\theta_2$.

In the first embodiment 100 of the optical circulator just described, only the parallel polarization components P1 and P2 are deviated by the walk-off crystals 120A and 120B. The orthogonal polarization components O1 and O2 pass through these walk-off crystals without deviation. This results in an optical path length difference between the polarization components of the light beams X Y and Z. If the modulation rate of the light beam is high enough for this optical path length difference between its polarization components to degrade performance, a birefringent crystal (not shown) can be included in either or both the first I/O port 102 or 108 and the second I/O port 112. The birefringent crystal is preferably located between the walk-off crystal 120 and the split polarization rotator 122. The birefringent crystal is orientated with its higher refractive index direction aligned perpendicular to the walk-off direction 128. If the walk-off crystal 120 has a thickness of $\alpha$ and a refractive index difference of $\Delta n_1$, and the birefringent crystal has a refractive index difference of $\Delta n_2$, then the birefringent crystal should have a thickness of $\alpha \Delta n_1 / \Delta n_2$.

A second embodiment 200 of the optical circulator according to the invention is shown in FIGS. 5A and 5B, and its operation is shown in FIGS. 6A–6I (forward direction) and 7A–7I (reverse direction). In the second embodiment 200, the orthogonal and parallel polarization components of the light beams X, Y and Z have equal path lengths. In the second embodiment of the optical circulator, elements that are the same as those of the first embodiment are indicated using the same reference numerals and will not be described further. Elements that are similar are indicated using the same reference numerals increased by 100.

In the optical circulator 200, the perpendicular walk-off crystal 145 and lens 109 are identical to the perpendicular walk-off crystal and lens, respectively, of the first embodiment 100. The first I/O port 208 includes the walk-off crystal 120A and the split polarization rotator 222A, and preferably includes the light coupling assembly 110A. The first I/O port 208 differs from the first I/O port 108 described above with reference to FIGS. 4A–4D in that the light coupling assembly is laterally offset in the direction perpendicular to the lateral axis 158 (FIG. 1C). This offsets PORT 1 and PORT 2 laterally from the optical axis 144 defined by the lens 109. The light coupling assembly is offset from the optical axis in the direction opposite to the walk-off direction 128A of the walk-off crystal 120A by about one-half of the walk-off distance of the walk-off crystal. To centralize the light beams in the elements of the first I/O port, the walk-off crystal 120A and the split polarization rotator 222A are preferably centered on the optical axis 144.

The second I/O port 218 is structurally similar to the first I/O port 208. The light coupling assembly 110B is laterally offset so that PORT 3 is offset from the optical axis 144 in the walk-off direction of the walk-off crystal 120B by about one-half of the walk-off distance of the walk-off crystal. The walk-off crystal 120B and the split polarization rotator 222B are preferably centered on the optical axis. The split polarization rotator 222B is similar to the split polarization rotator 222A.

With respect to light passing in the forward direction through the second embodiment 200 of the optical circulator, the walk-off direction 128B of the walk-off crystal 120B of the second I/O port 218 is opposite to the walk-off direction 128A of the walk-off crystal 120A of the first I/O port 208, the positive half wave plate 136A of the opposed half-wave plate pair 141B is on the opposite side of the optical axis from the positive half wave plate 136B of the opposed half-wave plate pair 141A of the first I/O port, and the direction of rotation of the Faraday rotator 143 is the same in both I/O ports.

The light coupling assemblies 110A and 110B may be omitted from the I/O ports 208 and 218 if the lateral spacing between the light beams X and Y is otherwise accurately defined, and the light beams X, Y and Z have an acceptably low lateral spread, as discussed above.

The perpendicular walk-off crystal 145 is also preferably centered on the optical axis 144.

Operation of the optical circulator 200 on the light beams X and Y passing in the forward direction from PORT 1 to PORT 3 is illustrated in FIGS. 6A–6I using the same conventions as in FIGS. 2A–2I. The operation of the first I/O port 208 and the perpendicular walk-off crystal 145 on the polarization components of the light beams X and Y is shown in FIGS. 6A–6E. Since this operation is the same as that described above with reference to FIGS. 2A–2E, it will not be described again here. The lateral offset of PORT 1 and PORT 2 from the optical axis 144 does not change the operation of this part of the optical circulator, but does change the positions of axes 160 and 162 and the displaced locations 170 and 172 relative to the optical axis 144.

The lens 109 inverts the positions of the polarization components O1, P1, O2 and P2 about the optical axis 144. Since the orthogonal polarization component O1 and the parallel polarization component P1 of the light beam X respectively enter the lens located at the locations 162 and 172 symmetrically disposed about the optical axis, the lens interchanges the positions of the polarization components of the light beam X about the optical axis, as can be seen by comparing FIGS. 6E and 6F. Thus, the orthogonal and parallel polarization components O1 and P1 of the light beam X leave the lens and enter the second I/O port 218 at the displaced locations 172 and 162, respectively. These are the locations at which the polarization components of the light beam Y entered the perpendicular walk-off crystal 145, as shown in FIG. 6D. The displaced location 162 corresponds to the axis 164 of PORT 3.

The lens 109 also inverts the positions of the orthogonal and parallel polarization components O2 and P2 of the light beam Y about the optical axis 144. Thus, again as shown in FIG. 6F, the orthogonal and parallel polarization components O2 and P2 respectively leave the lens and enter the second I/O port 218 at the locations 170 and 160. These are the locations at which the polarization components of the light beam X entered the perpendicular walk-off crystal 145, as shown in FIG. 6D.

As the polarization components enter the second I/O port 218 from the lens 109, the orthogonal polarization components O1 and O2 are aligned with the positive half of the split polarization rotator 222B, and the parallel polarization components P1 and P2 are aligned with the negative half of the split polarization rotator. The orthogonal polarization components and the parallel polarization components are symmetrically disposed about the line of attachment 134B of the opposed half-wave plate pair 141B, as shown in FIG. 6F.

The polarization components passing through the optical circulator 200 in the forward direction pass through the split polarization rotator 222B of the second I/O port 218 in the reverse direction of the split polarization rotator. Consequently, the direction of polarization of the orthogonal polarization components O1 and O2 is rotated through 90° by the polarization components passing through the positive half of the split polarization rotator 222B. The direction of polarization of the parallel polarization components P1 and P2 is unchanged by the polarization components passing through the negative half of the split polarization rotator. FIG. 6H shows the polarization components as they enter the walk-off crystal 120B from the split polarization rotator 222B. The split polarization rotator rotating the direction of polarization of the orthogonal polarization components O1 and O2 sets the directions of polarization of the orthogonal polarization components perpendicular to their respective parallel polarization components P1 and P2, and aligns the orthogonal polarization components parallel to the walk-off direction 128B of the walk-off crystal 120B. FIG. 6G shows the polarization components as they enter the opposed half-wave plate pair 141B from the Faraday rotator 143B.

The walk-off crystal 120B deflects the orthogonal polarization components O1 and O2 by its walk-off distance in its walk-off direction 128B. The walk-off crystal passes the parallel polarization components P1 and P2 without deflecting them. The walk-off distance of the walk-off crystal 120B is such that the orthogonal polarization component O1 of the light beam X is overlaid on the parallel polarization component P1 of the light beam X at the location of the axis 164 of PORT 3. The walk-off distance of the walk-off crystal 120B is also such that the orthogonal polarization component O2 of the light beam Y is overlaid on the parallel polarization component P2 of the light beam Y at the location of the axis 160, laterally displaced from PORT 3.

The paths of the orthogonal and parallel polarization components O1 and P1 of the light beam Y as they pass through the optical circulator 200 are shown in FIG. 5B. The orthogonal polarization component is indicated by the dash line 186 and the parallel polarization component is indicated by the dash-dot line 188. Only the parallel polarization component is deflected laterally by the walk-off crystal 120A in the first I/O port 208, whereas only the orthogonal polarization component is deflected by the walk-off crystal 120B in the second I/O port 218. This results in a zero path length length difference between the polarization components.

The operation of the optical circulator 200 in the reverse direction is illustrated in FIGS. 7A–7I. These figures show the polarization components O1 and P1 of the light beam Z and the polarization components O2 and P2 of the spurious light beam S at various points in the optical circulator 200 indicated by the section lines 7A—7A through 7I—7I in FIG. 5A. The views are all in the direction in which the light passes through the optical circulator. The spurious light beam S enters the second I/O port of the optical circulator at exit point of the light beam Y in the forward direction.

The light beams Z and S enter the walk-off crystal 120B at the locations 164, corresponding to the axis of PORT 3, and 160, respectively. The walk-off crystal 120B deflects the parallel polarization components P1 and P2 in the direction of its walk-off direction 128B. This aligns the parallel polarization components P1 and P2 with the positive half of the split polarization rotator 222B and aligns the orthogonal polarization components O1 and O2 with the negative half of the split polarization rotator 222B. The polarization components passing through the optical circulator 200 in the reverse direction pass through the split polarization rotator 222B of the second I/O port 208 in the forward direction of the split polarization rotator. Consequently, the split polarization rotator rotates the direction of polarization of the orthogonal polarization components, but not that of the parallel polarization components, though 90°, as can be seen by comparing FIGS. 7B and 7D.

The lens 109 inverts the positions of the polarization components about the optical axis 144. As a result, the polarization components O1, P1, O2 and P2 respectively enter the perpendicular walk-off crystal 145 at the locations 172, 162, 176 and 174, with their directions of polarization perpendicular to the walk-off direction 166. The location 162 of PORT 2 in the first I/O port corresponds to the axis 164 of PORT 3 in the second I/O port. This is shown in FIG. 7E. None of the polarization components is rotated or deflected by the perpendicular walk-off crystal 145, as shown in FIG. 7F.

In the first I/O port 208, the orthogonal polarization components O1 and O2 are aligned with the negative half of the split polarization rotator 222A, and the parallel polarization components are aligned with the positive half of the split polarization rotator. The polarization components passing through the optical circulator 200 in the reverse direction pass through the split polarization rotator 222A in the reverse direction of the split polarization rotator. Consequently, the split polarization rotator rotates the direction of polarization of the parallel polarization components P1 and P2, but not that of the orthogonal polarization components O1 and O2, through 90°. This sets the directions of polarization of the parallel polarization components perpendicular to those of their respective orthogonal polarization components. The orthogonal polarization components remain parallel to the walk-off direction 128A of the walk-off crystal 120A.

FIG. 7H shows the polarization components as they enter the walk-off crystal 120A from the split polarization rotator 222A. FIG. 7G shows the polarization components as they enter the opposed half-wave plate pair 141A from the Faraday rotator 143A.

The walk-off crystal 120A deflects the orthogonal polarization components O1 and O2 by its walk-off distance in the direction of its walk-off direction 128A, and passes the parallel polarization components P1 and P2 without deflecting them. This overlays the orthogonal polarization component O1 of the light beam Z on the parallel polarization component P1 of the light beam Z at the location of the axis 162, i.e., at PORT 2, as shown in FIG. 7I. This also overlays the orthogonal polarization component O2 of the light beam S on the parallel polarization component P2 of the light beam S at the displaced location 174, which is laterally displaced from both PORT 1 and PORT 2. Thus, only the light beam Z entering the optical circulator via PORT 3 is transmitted to PORT 2. The spurious light beam S is transmitted to neither PORT 1 nor PORT 2.

The lateral offset between PORT 1, PORT2 and PORT 3 and the optical axis 144 requires the lens 109 to be a low astigmatism lens. The simplest way to reduce the astigmatism of the lens 109 is to increase focal length of the lens. This requires that the spacing between the lens and the first faces of the first and second I/O ports 208 and 218 be increased, which increases the physical size of the optical circulator 200.

Two alternative embodiments of the zero path-length difference optical circulator are shown in FIGS. 8A–8C, 9A and 9B. In these Figures, elements corresponding to the embodiments shown in FIGS. 1A and 5A are indicated using the same reference numerals. In the embodiment 300 shown in FIGS. 8A–8C, and the embodiment 400 shown in FIGS. 9A and 9B, the first I/O port 208 and the perpendicular walk-off crystal 145 are identical to the corresponding elements shown in FIG. 5A, and will not be described again here.

In both embodiments 300 and 400, the second I/O ports 318 and 412 are similar to the second I/O port 112 shown in FIGS. 1A and 1B, but differ in that the optical axis 164 of PORT 3 is offset from the optical axis 144, and in that the second I/O port 318 includes the light coupling assembly 110B. The offset is in the walk-off direction 128B of the walk-off crystal 120B and the offset distance is about one-half of the walk-off distance of the walk-off crystal 120B. This places PORT 3 on the opposite side of the optical axis from PORT 1 and PORT 2. The second I/O ports 318 and 412 also differ from the second I/O port 112 in that the opposed half-wave plate pair 222B is preferably centered on the optical axis 144, as in the second I/O port 218.

Both of the embodiments 300 and 400 lack the lens 109.

In the embodiment 300 shown in FIGS. 8A–8C, the perpendicular walk-off crystal 145 is spaced from the second I/O port 318, and the converging four-element microlens array 301 is located adjacent the second face 190 of the perpendicular walk-off crystal. Alternatively, the perpendicular walk-off crystal may be spaced from the first I/O port 302, and the microlens array may be located adjacent the first face 192 of the perpendicular walk-off crystal. Microlens arrays with a spacing of 250 μm between the optical axes of adjacent lenses 303 and 305, and 303 and 307 are available from Nippon Sheet Glass Co. The I/O ports may be easily modified to double the spacing between the optical axes 160 and 162 and to double the walk-off distance of the walk-off crystals 120A and 120B. With this change, each of the four lenses 303, 305, 307 and 309 in the microlens array is centered on the axis of one of the polarization components O1, P1, O2 and P2 as the polarization components leave the perpendicular walk-off crystal. The focal length of the lenses in the microlens array, and the spacing between the first face 124A of the walk-off crystal 120A and the first face 124B of the walk-off crystal 120B are chosen so that the microlenses form an image of PORT 1 at PORT 3 and forms an image of PORT 3 at PORT 2.

Figure 9A:
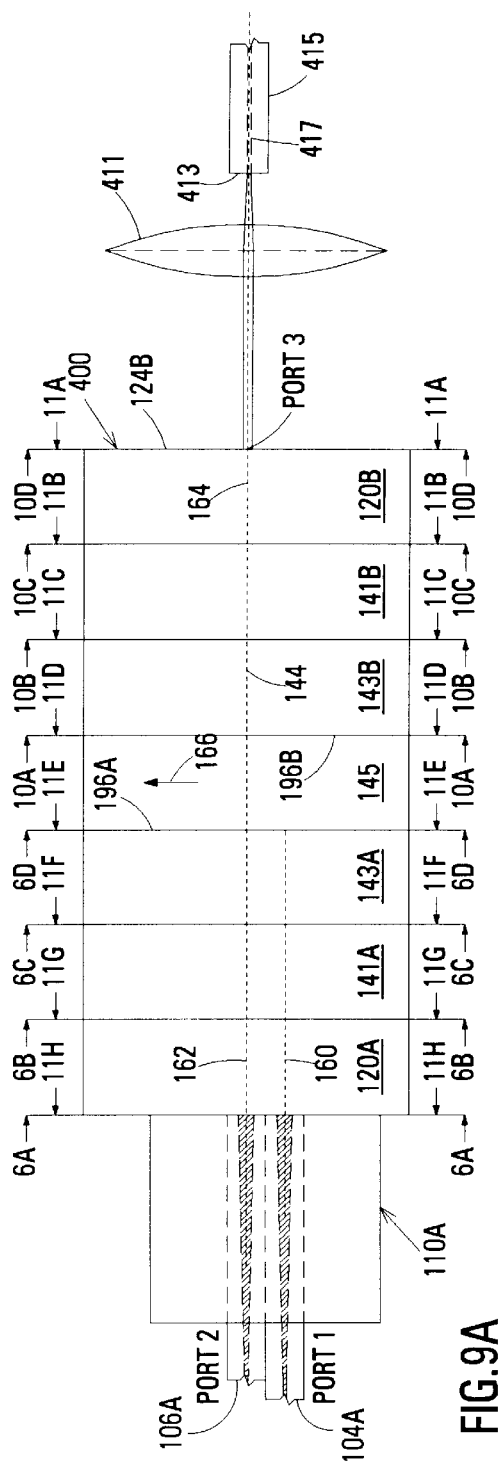
FIGS. 9A and 9B are respectively side and top views of a fourth embodiment of an optical circulator according to the invention in which the path-length difference between the polarization components is zero.
Figure 9B:
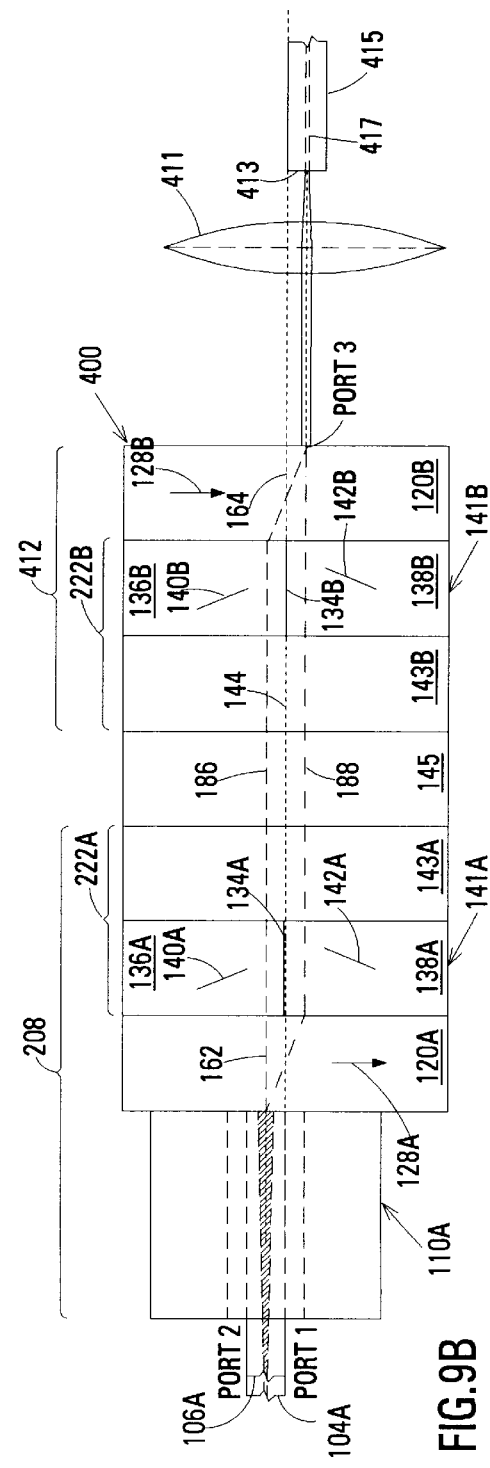

In the embodiment 400 shown in FIGS. 9A and 9B, the perpendicular walk-off crystal 145 is mounted in contact with both the first I/O port 208 and the second I/O port 412, so that the first I/O port 208, the second I/O port 318 and the perpendicular walk-off crystal 145 all form a monolithic block. The converging lens 411 is located adjacent the first face 124B of the walk-off crystal 120B with its optical axis aligned with the optical axis 164 of PORT 3, i.e., laterally offset from the optical axis 144. Although the conventional bi-convex lens shown in FIGS. 9A and 9B can be used as the lens 411, a cylindrical gradient index (GRIN) lens is preferred, since this type of lens is easier to mount in this embodiment. Other suitable types of lens, such as a ball lens, can alternatively be used.

The converging lens 411 converges the light leaving PORT 3 on the end 413 of the optical fibre 415, and converges the light leaving the end of the optical fibre on PORT 2. Preferably, the optical fibre 415 is a single-mode fibre. The focal length of the lens, the spacing between the first face 124B of the walk-off crystal 120B and the lens, and the spacing between the lens and the optical fibre 415 are chosen so that the lens forms an image of PORT 1 on the end 413 of the optical fibre and forms an image of the core 417 of the optical fibre at PORT 2.

In the embodiments shown in FIGS. 1A, 5A and 8A, the polarization components of the light beams X and Y diverge as they pass through the optical circulator from PORT 1 and PORT 2. However, the polarization components are re-converged part-way throught the optical circulator by the lens 109 or the lens array 301 before they pass through the opposed half-wave plate pair 141B in the second I/O port. Similarly, the polarization components of the light beam Z diverge as they pass through the optical circulator from PORT 3, but are re-converged before they pass through the opposed half-wave plate pair 141A. However, in the embodiment shown in FIGS. 9A and 9B, the polarization components diverge as they pass through the optical circulator from PORT 1, but are not re-converged before they reach the opposed half-wave plate pair 141B. Consequently, in this embodiment, greater precautions must be taken to prevent the polarization components from intersecting the line of attachment 134B of the opposed half-wave plate pair 141B. These precautions may include further reducing the angle of divergence of the polarization components as they enter the optical circulator, reducing the allowed tolerance on the offset between the line of attachment 134B and the optical axis 144, and increasing the walk-off distance of the walk-off crystals 120A and 120B.

The operation of the embodiments 300 and 400 shown in FIGS. 8A, 8B, 9A and 9B will now be described with reference to FIGS. 6A–6D, 10A–10D and 11A–11H using the same conventions as in FIGS. 2A–2I. In the forward direction, the operation of the first I/O port 208 and the perpendicular walk-off crystal 145 on the polarization components of the light beams X and Y is the same as that described above with reference to FIGS. 2A–2E and as shown in FIGS. 6A–6E, so will not be described again here.

Figure 10D:
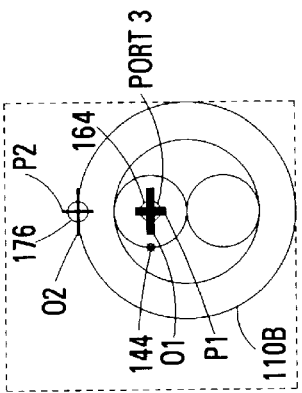
FIGS. 10A through 10D illustrate the action of the second I/O port of the third and fourth embodiments of the optical circulator according to the invention on light passing through the optical circulators in the forward direction.
Figure 10C:
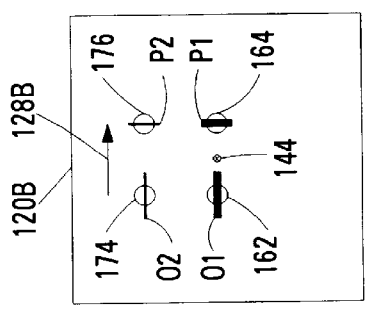
Figure 10B:
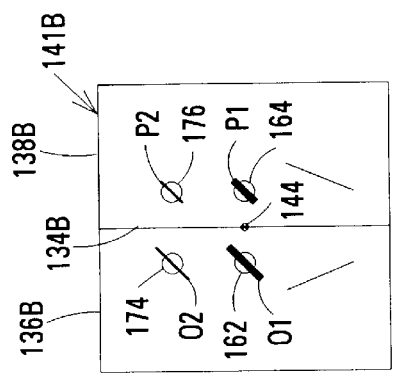
Figure 10A:
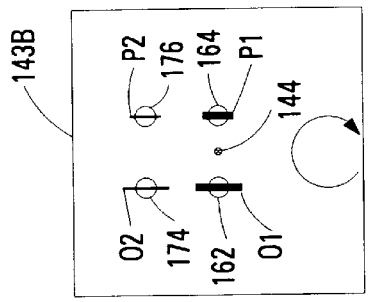

The operation of the second I/O ports 318 and 412 of the embodiments 300 and 400 is shown in FIGS. 10A–10D. FIG. 10A shows the polarization components O1, P1, O2 and P2 as they enter the second I/O port from the perpendicular walk-off crystal 145. The orthogonal polarization component O1 enters the positive half of the split polarization rotator 222B at the location 164, which corresponds to the optical axis of PORT 2. The parallel polarization component P1 enters the negative half of the split polarization rotator at the location 164, which corresponds to the optical axis of PORT 3. The polarization components O2 and P2 respectively enter the positive and negative halves of the split polarization rotator at the displaced locations 174 and 176, respectively. The opposed half-wave plate pair 122B is centered on the optical axis. Consequently, the orthogonal polarization components and the parallel polarization components are symmetrically disposed about the line of attachment 134B of the opposed half-wave plate pair 141B.

The polarization components passing through the optical circulators 300 and 400 in the forward direction pass through the split polarization rotator 222B in the reverse direction of the split polarization rotator. Consequently, the direction of polarization of the orthogonal polarization components O1 and O2 is rotated through 90° by the polarization components passing through the positive half of the split polarization rotator. The direction of polarization of the parallel polarization components P1 and P2 remains unchanged by these polarization components passing through the negative half of the split polarization rotator.

FIG. 10C shows the polarization components as they enter the walk-off crystal 120B from the split polarization rotator 222B. The split polarization rotator rotating the direction of polarization of the orthogonal polarization components O1 and O2 the sets the directions of polarization of the orthogonal polarization components perpendicular to those of their respective parallel polarization components P1 and P2, and aligns the orthogonal polarization components parallel to the walk-off direction 128B of the walk-off crystal 120B. FIG. 10B shows the polarization components as they enter the opposed half-wave plate pair 141B from the Faraday rotator 143B in the split polarization rotator 222B.

The walk-off crystal 120B deflects the orthogonal polarization components O1 and O2 by its walk-off distance in its walk-off direction 128B. The walk-off crystal passes the parallel polarization components P1 and P2 without deflecting them. The walk-off distance of the walk-off crystal 120B is such that the orthogonal polarization component O1 of the light beam X is overlaid on the parallel polarization component P1 of the light beam X at the location of the axis 164, i.e., at PORT 3, and the orthogonal polarization component O2 of the light beam Y is overlaid on the parallel polarization component P2 of the light beam Y at the location 176, laterally displaced from PORT 3. This is shown in FIG. 10D. Thus, only the light beam X is transmitted to PORT 3. The light beam Y is transmitted to a point laterally offset from PORT 3, and no light from the light beam Y enters PORT 3.

The action of the embodiments 300 and 400 on light passing in the reverse direction is illustrated in FIGS. 11A–11H. These figures show the polarization components O1 and P1 of the light beam Z and the polarization components O2 and P2 of the spurious light beam S at various points in the optical circulators 300 and 400 indicated by the section lines 11A—11A through 11H—11H in FIGS. 8A and 9A. The views are all in the direction in which the light passes through the optical circulator. The spurious light beam S enters the second I/O port of optical circulator at the displaced location 176, corresponding to the exit point of the light beam Y in the forward direction.

In the reverse direction, the walk-off crystal 120B deflects the parallel polarization components P1 and P2 in its walk-off direction 128B. This aligns the parallel polarization components with the positive half of the split polarization rotator 222B and aligns the orthogonal polarization components O1 and O2 with the negative half of the split polarization rotator. The polarization components passing through the optical circulators 300 and 400 in the reverse direction pass through the split polarization rotator 222B of the second I/O ports 218 and 412, respectively, in the forward direction of the split polarization rotator. Consequently, the split polarization rotator rotates the direction of polarization of the orthogonal polarization components, but not that of the parallel polarization components, though 90°, as can be seen by comparing FIGS. 11B and 11D. FIG. 11C shows the polarization components as they enter the Faraday rotator 143B from the opposed half-wave plate pair 141B.

The polarization components enter the perpendicular walk-off crystal 145 with their directions of polarization perpendicular to the walk-off direction 166. This is shown in FIG. 11D. None of the polarization components is rotated or deflected by the perpendicular walk-off crystal.

After passing through the perpendicular walk-off crystal 145, the orthogonal polarization components O1 and O2 are aligned with the negative half of the split polarization rotator 222A of the first I/O port 208, and the parallel polarization components are aligned with the positive half of the split polarization rotator. The polarization components passing through the optical circulators 300 and 400 in the reverse direction pass through the split polarization rotator 222A in the reverse direction of the split polarization rotator. Consequently, the split polarization rotator rotates the direction of polarization of the parallel polarization components, but not that of the orthogonal polarization components, through 90°. This sets the directions of polarization of the parallel polarization components P1 and P2 perpendicular to those of the orthogonal polarization components O1 and O2. The directions of polarization of the orthogonal polarization components remain parallel to the walk-off direction 128B of the walk-off crystal 120B, as shown in FIG. 11G.

The walk-off crystal 120B deflects the orthogonal polarization components O1 and O2 by its walk-off distance in its walk-off direction 128B, and passes the parallel polarization components P1 and P2 without deflecting them. The orthogonal polarization component O1 of the light beam Z is overlaid on the parallel polarization component P1 of the light beam Z at the location of the axis 162, i.e., at PORT 2, as shown in FIG. 11H. Also, the orthogonal polarization component O2 of the light beam S is overlaid on the parallel polarization component P2 of the light beam S at a location corresponding to the displaced location 174. The displaced location 174 is laterally displaced from both PORT 1 and PORT 2. Thus, only the light beam Z entering the optical circulator via PORT 3 is transmitted to PORT 2. The spurious light beam S is transmitted to neither PORT 1 nor PORT 2.

A fully symmetrical embodiment 500 of the optical circulator according to the invention is shown in FIGS. 12A and 12B. In the embodiment 500, the orthogonal and parallel polarization components of the light beams X, Y and Z have equal path lengths, and PORT 2 and PORT 3 are located on the optical axis 144. Elements in the embodiment 500 that are the same as those of the embodiment 200 shown in FIGS. 5A and 5B are indicated using the same reference numerals and will not be described further.

In the optical circulator 500, the perpendicular walk-off crystal 145 and lens 109 are the same as the perpendicular walk-off crystal and lens, respectively, of the embodiment 200 shown in FIGS. 5A and 5B. The lens arrangements shown in FIGS. 8A and 8B, and in FIGS. 9A and 9B may alternatively be used. The first I/O port 508 differs from the first I/O port 208 in that the compound walk-off crystal 520A is substituted for the walk-off crystal 120A. The compound walk-off crystal 520A is composed of the walk-off crystal element 521A, the 45° half-wave plate 523A, and the walk-off crystal element 525A arranged in order along the optical axis 144 in the forward direction of light transmission. The walk-off crystal elements 521A and 523A preferably have equal thicknesses, and hence equal walk-off distances. The total of the walk-off distances of the walk-off crystal elements 521A and 523A is equal to the desired lateral separation between the orthogonal and parallel polarization components. For example, in an embodiment corresponding to the embodiment 200 described above with reference to FIGS. 5A and 5B, in which the walk-off crystal 120A had a thickness of 1.25 mm, the thickness of the walk-off crystal elements 521A and 525A was 0.612 mm. This arrangement provided the same lateral separation between the polarization components as the walk-off crystal 120A in the embodiment 200.

The walk-off crystal elements 521A and 525A are mounted with their walk-off directions opposite to one another, and perpendicular to the lateral axis 158 extending between the optical axes 160 and 162 of PORT 1 and PORT 2 (see FIG. 1C). The walk-off direction 527A of the walk-off crystal element 521A is directed towards the positive half-wave plate 136A in the split polarization rotator 222A. The walk-off direction 529A of the walk-off crystal element 525A is towards the negative half-wave plate 138A in the split polarization rotator 222A.

The first I/O port 508 further differs from the first I/O port 208 in that the positive half-wave plate 136A is preferably located to the right of the optical axis 144 relative to the forward direction of light transmission. Alternatively, the positive half-wave plate to the left of the optical axis, in which case, the walk off directions of the walk-off crystal elements 521A and 523A are reversed so that the walk off direction 527A of the walk-off crystal element 521A is still directed towards the positive half-wave plate 136A, and the walk off direction 529A of the walk-off crystal element 525A is still directed towards the negative half-wave plate 138A.

The second I/O port 512 is similar to the first I/O port 508. With respect to light passing in the forward direction through the embodiment 500 of the optical circulator, the walk-off direction 527B of the walk-off crystal 521B is the same as the walk-off direction 527A of the walk-off crystal 521A of the first I/O port, the walk-off direction 529B of the walk-off crystal 525B is the same as the walk-off direction 529A of the walk-off crystal 525A, the positive half-wave plate 136B of the opposed half-wave plate pair 141B is on the same side of the optical axis as the positive half-wave plate 136A of the opposed half-wave plate pair 141A of the first I/O port, and the direction of rotation of the Faraday rotator 143 is the same in both I/O ports.

Operation of the optical circulator 500 on the light beams X and Y passing in the forward direction from PORT 1 to PORT 3 is illustrated in FIGS. 13A–13J using the same conventions as in FIGS. 2A–2I.

Figure 13A:
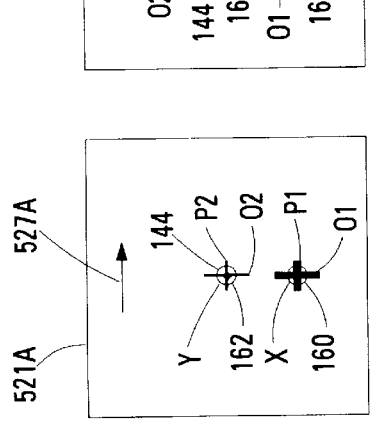
FIGS. 13A through 13I illustrate the action of the fifth embodiment of the optical circulator according to the invention on light passing through the optical circulator in the forward direction.
Figure 13B:
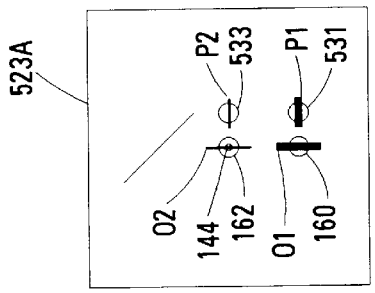

The light beams X and Y respectively enter the first I/O port 508 along the axes 160, corresponding to PORT 1, and 162, corresponding to PORT 2. The axis 162 coincides with the optical axis 144. This is shown in FIG. 13A. The walk-off crystal element 521A deflects the parallel polarization components P1 and P2 in its walk-off direction 527A by its walk-off distance to the displaced locations 531 and 533, respectively, as shown in FIG. 13B.

Figure 13C:
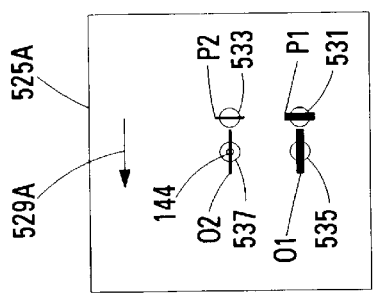

The polarization components enter the 45° half-wave plate 523A. The half-wave plate rotates the direction of polarization of each of the polarization components through 90°, as shown in FIG. 13C. This aligns the parallel polarization components P1 and P2 perpendicular to, and the orthogonal polarization components O1 and O2 parallel to, the walk-off direction 529A of the walk-off crystal 525A.

Figure 13D:
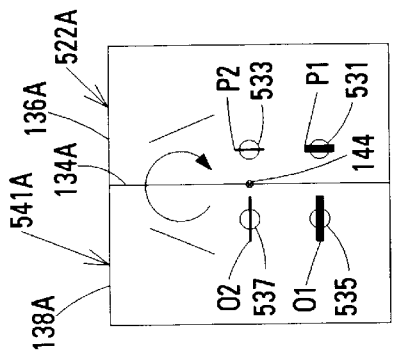
Figure 13E:
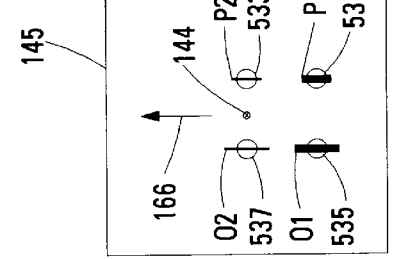

The walk-off crystal element 525A deflects the orthogonal polarization components O1 and O2 in its walk-off direction 529A by its walk-off distance to the displaced locations 535 and 537, respectively. Since the walk-off distance and walk-off direction of the walk-off crystal element 525A are equal and opposite to the walk-off distance and walk-off direction of the walk-off crystal element 521A, the walk-off crystal element 525A deflects the orthogonal polarization components equally and opposite to the deflection of the parallel polarization components. This disposes the parallel polarization components and the orthogonal polarization components symmetrically about the line of attachment 134A of the opposed half-wave plate pair 541A forming part of the split polarization rotator 222A, as shown in FIG. 13D.

The parallel polarization components P1 and P2 pass through the positive half of the split polarization rotator 222A, which leaves their direction of polarization unchanged. The orthogonal polarization components O1 and O2 pass through the negative half of the split polarization rotator 222A, which rotates their direction of polarization by 90°. As a result, the polarization components enter the perpendicular walk-off crystal 145 with their directions of polarization parallel to the walk-off direction 166 of this walk-off crystal. The locations 531, 533, 535 and 537 of the polarization components P1, P2, O1 and O2 relative to the optical axis 144 correspond to the locations 170, 172, 160 and 162, respectively, of the same polarization components in the embodiment 200 shown in FIG. 6D.

Since the perpendicular walk-off crystal 145, the lens 109 and the split polarization rotator 222B in the embodiment 500 are the same as the corresponding elements of the embodiment 200 shown in FIGS. 5A and 5B, and since the polarization components enter the perpendicular walk-off crystal 145 of the embodiment 500 in the same locations relative to the optical axis as they enter the perpendicular walk-off crystal in the embodiment 200, the operation of the perpendicular walk-off crystal 145, the lens 109 and the split polarization rotator 222B in the embodiment 500 is the same as that described above with reference to FIGS. 6E–6G, and will not be described again here.

Figure 13F:
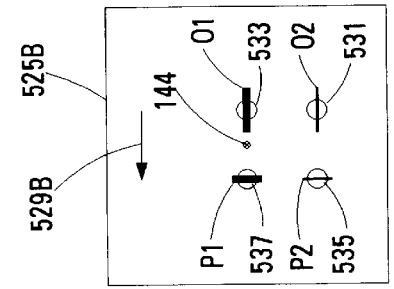

FIG. 13F shows the polarization components as they enter the compound walk-off crystal 520B from the split polarization rotator 222B in the second I/O port 518. The parallel polarization components P1 and P2 are perpendicular to, and the orthogonal polarization components O1 and O2 are parallel to, the walk-off direction 529B of the walk-off crystal element 525B. The orthogonal polarization components O1 and O2 are located at the locations 172 and 170, respectively, and the parallel polarization components P1 and P2 are located at the locations 537 and 535, respectively.

Figure 13G:
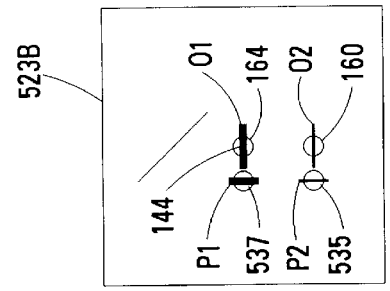

The walk-off crystal element 525B deflects the orthogonal polarization components in its walk-off direction 529B by its walk-off distance. This locates the orthogonal polarization component O1 at the axis 164 of PORT 3. The axis 164 coincides with the optical axis in this embodiment. This also locates the orthogonal polarization component O2 at the location 160, as shown in FIG. 13G.

Figure 13H:
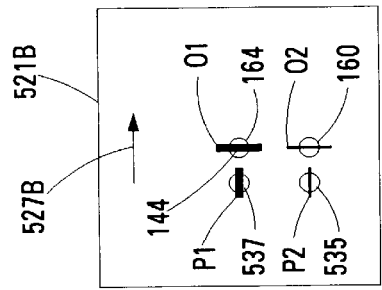
Figure 13I:
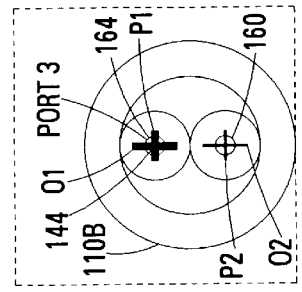
Figure 14E:
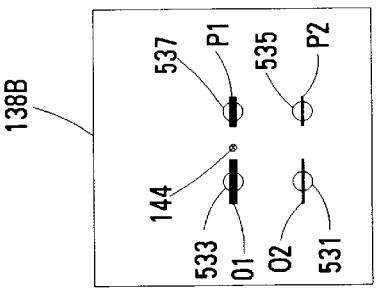
FIGS. 14A through 14J illustrate the action of the fifth embodiment of the optical circulator according to the invention on light passing through the optical circulator in the reverse direction.
Figure 14D:
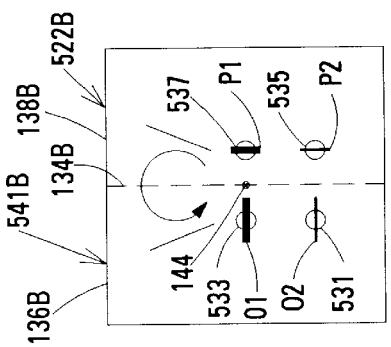
Figure 14C:
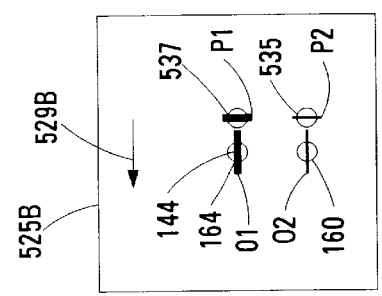
Figure 14B:
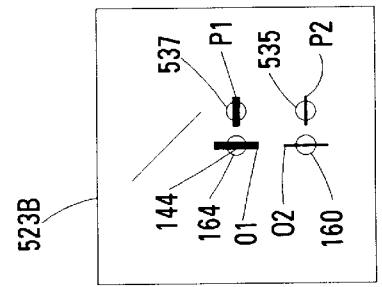
Figure 14A:
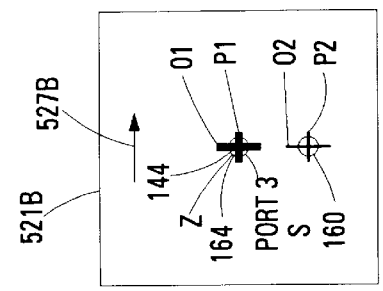
Figure 14J:
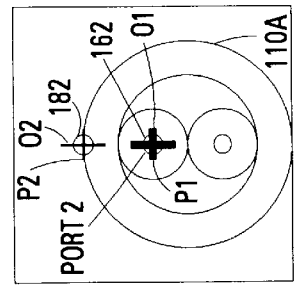
Figure 14I:
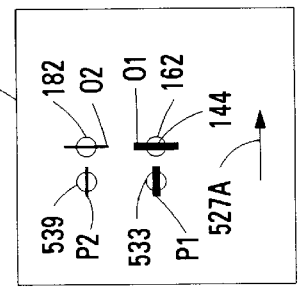
Figure 14H:
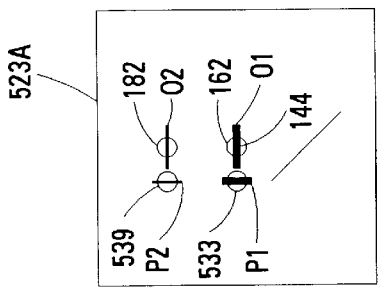
Figure 14G:
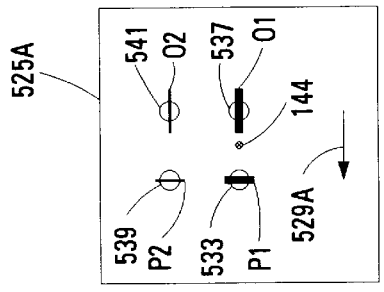
Figure 14F:
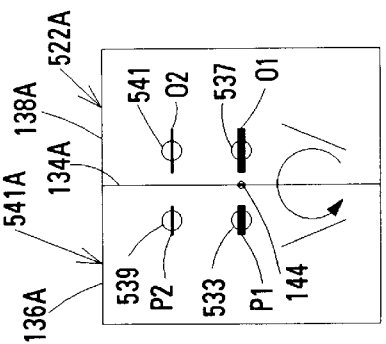

The polarization components enter the 45° half-wave plate 523B from the walk-off crystal 525B. The half-wave plate rotates the direction of polarization of each polarization component through 90°, as shown in FIG. 13H. This aligns the orthogonal polarization components O1 and O2 perpendicular to, and the parallel polarization components P1 and P2 parallel to, the walk-off direction 527B of the walk-off crystal element 521B.

The walk-off crystal element 521B deflects the parallel polarization components P1 and P2 in its walk-off direction 527B by its walk-off distance. The walk-off crystal element passes the orthogonal polarization components O1 and O2 without deflecting them. The total of the walk-off distances of the walk-off crystal elements 521B and 525B is such that the parallel polarization component P1 of the light beam X is overlaid on the orthogonal polarization component O1 of the light beam X at the location of the axis 164, i.e., at PORT 3, and the parallel polarization component P2 of the light beam Y is overlaid on the parallel polarization component O2 of the light beam Y at the location of the axis 160, laterally displaced from PORT 3. Thus, only the light beam X entering the optical circulator via PORT 1 is transmitted to PORT 3.

FIGS. 14A–14J illustrate the operation of the optical circulator 500 on light passing in the reverse direction from PORT 3 to PORT 2. Since the operation of the elements of the optical circulator 500 should by now be well understood, these Figures will not be separately described.

A process for making the optical circulators according to the invention is illustrated in FIGS. 16A–16D. The small size of the walk-off crystals, half-wave plates and Faraday rotators constituting the optical circulators described in this disclosure means that the optical circulators would be tedious and expensive to assemble individually. However, the simple structure of the optical circulators enables them to be easily and inexpensively made in batches.

First, the method according to the invention of making the plate pair blocks used in the manufacture of the optical circulators according to the invention will be described with reference to FIG. 15. Elongate half-wave plate blocks having square or rectangular cross section are commercially available. These half-wave plate blocks are available with faces that are polished, accurately parallel or perpendicular to one another, and accurately oriented at a defined angle relative to the optical axis of the half-wave plate block. However, to reduce costs, the ends of the half-wave plate blocks need not be polished. Unpolished surfaces are indicated by shading throughout FIG. 15.

Figure 15:
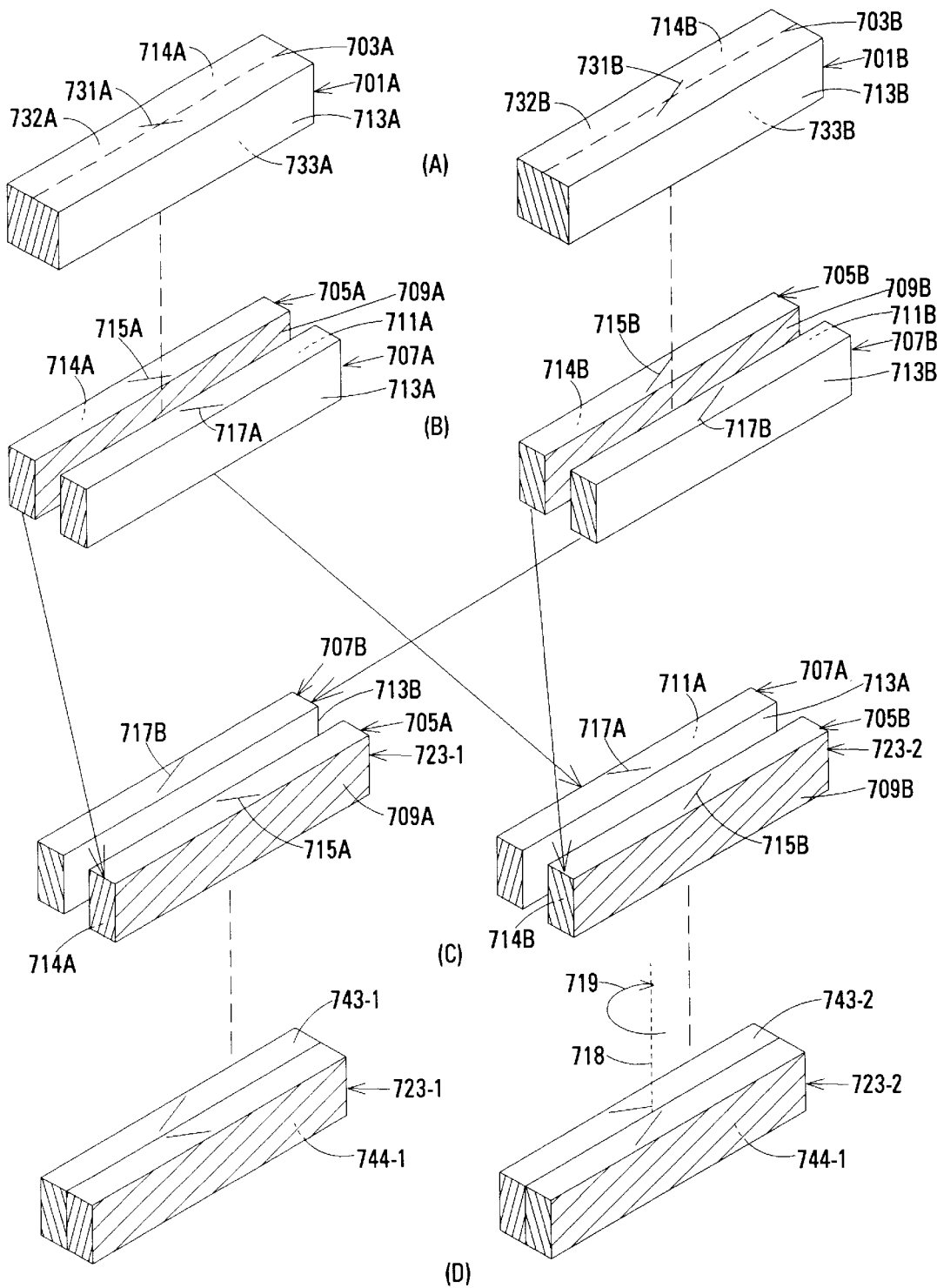
FIG. 15 illustrates the method according to the invention of making the plate pair blocks used in the manufacture of the optical circulators according to the invention.

In a practical embodiment, two half-wave plate blocks 701A and 701B, each about 1 mm wide, 1 mm thick and 10 mm long, as shown in (A) of FIG. 15, were used. In the following description, corresponding elements of the half-wave plate blocks 701A and 701B are indicated by the same reference numeral with the letter A or B, respectively, added. If no letter is added to a reference numeral referring to an element of the half-wave plate blocks 701A and 701B, or to the half-wave plate blocks themselves, the reference is to be understood to refer to both half-wave plate blocks.

Each half-wave plate block 701A and 701B includes the polished side surface 713 and the polished side surface 714 opposite the polished side surface 713. Each half-wave plate block also includes the polished top surface 732, perpendicular to the polished side surfaces 713 and 714, and the polished bottom surface 733, opposite the polished top surface.

The half-wave plate block 701A has its optical axis 731A oriented at −22.5° relative to the polished side surface 713A, the half-wave plate block 701B has its optical axis 731B oriented at +22.5° relative to the polished side surface 713B.

The half-wave plate block 701A is divided lengthways along the line 703A in a first dividing operation. This provides two half-wave plate halves 705A and 707A shown in (B). The half-wave plate block is preferably divided by sawing, but other suitable ways of dividing half-wave plate blocks, such as cleaving, may be used. The half-wave plate halves 705A and 707A each have a rough surface 709A and 711A, respectively, as a result of the dividing operation. The half-wave plate 701B is similarly divided to yield the half-wave plate halves 705B and 707B having the rough surfaces 709B and 711B, respectively.

As shown in (B), the optical axes 715A and 717A of the half-wave plate halves obtained by dividing the half-wave plate block 701A are parallel to one another, and the optical axes 715B and 717B of the half-wave plate halves obtained by dividing the half-wave plate block 701B are parallel to one another, but are angled at 45° to the optical axes 715A and 717A.

Referring briefly to FIGS. 1C and 1F, the opposed half-wave plate pair 122 is composed of one positive half-wave plate 136 whose axis is oriented at +22.5° to the line of attachment 134, and one negative half-wave plate 138 whose axis is oriented at −22.5° to the line of attachment. The polarization components pass through the opposed half-wave plate pair 141 within a few tens of microns of the line of attachment between the half-wave plates 136 and 138. To reduce diffraction of the polarization components at the line of attachment, it is preferred that the attachment faces 154 and 156, where the half-wave plates are joined to one another, be smooth and polished.

To make opposed half-wave plate pairs each composed of one positive half-wave plate and one negative half-wave plate attached to one another at smooth attachment surfaces without the need for additional polishing, a first plate pair block 723-1 is made from the half-wave plate halves 705A and 707B, and a second plate pair block 723-2 is made from the half-wave plate halves 705B and 707A. To make the first plate pair block 723-1, the half-wave plate half 707B is placed adjacent the half-wave plate half 705A with the polished surface 713B of the half-wave plate half 707B juxtaposed to the polished surface 714A of the half-wave plate half 705A, as shown in (C). To make the second plate pair block 723-2, the half-wave plate half 707A is placed adjacent the half-wave plate half 705B with the polished surface 713A of the half-wave plate half 707A juxtaposed to the polished surface 714B of the half-wave plate half 705B. Note that, in the second plate pair block 723-2, the "B" half-wave plate half is in front of the "A" half-wave plate half, whereas in the first plate pair block 723-1, the "B" half-wave plate half is behind the "A" half-wave plate half.

To form the first plate pair block 723-1, one of the opposed polished surfaces, for example the polished surface 713B, of the pair of half-wave plate halves 705A and 707B is coated with a thin layer of a suitable adhesive. The opposed smooth surfaces are brought into contact with one another, and the adhesive is cured. An optically-clear epoxy or a UV-cured epoxy is the preferred adhesive. The layer of adhesive holds the half-wave plate halves constituting the first plate pair block 723-1 together. The completed first plate pair block 723-1 is shown in (D). The second plate pair block 723-2 is similarly formed.

The first and second plate pair blocks 723-1 and 723-2 include the polished bottom surface 743-1 and 743-2, respectively, and the polished top surface 744-1 and 744-2, respectively. Each polished top surface is composed of one half of the polished top surfaces 732A and 732B of the half wave plate blocks 701A and 701B, and each polished bottom surface is composed of one half of the polished bottom surfaces 733A and 733B of the half-wave plate blocks 701A and 701B.

The above process makes the two plate pair blocks 723-1 and 723-2 in which the positive half-wave plate halves 705B and 707B are on opposite sides of the line of attachment between the polished surfaces 713B/714A and 713A/714B. One of the plate pair blocks, for example, the second plate pair block 723-2, may be rotated through 180° about the axis 718, as indicated by the arrow 719, to locate the positive half-wave plate halves on the same side of the line of attachment when this is required.

The method according to the invention of making multiple miniature I/O port assemblies from a single component block composed of relatively large optical components will now be described with reference to FIGS. 16A–16D. Each I/O port assembly includes a first I/O port to which a perpendicular walk-off crystal is attached. The I/O port assemblies can then be attached to one another to form the optical circulators according to the invention.

Figure 16A:
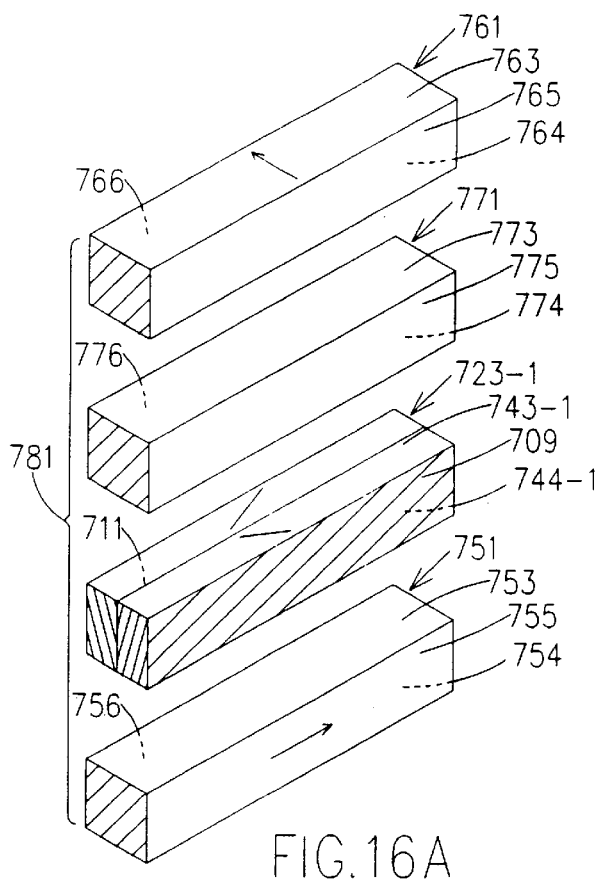
FIGS. 16A through 16D illustrates the method according to the invention of making multiple miniature I/O port assemblies from a single component block composed of relatively large optical components.

FIG. 16A shows the components of the component block 781. These components include the walk-off crystal block 751, the plate pair block 723-1, the Faraday rotator block 771, and the perpendicular walk-off crystal block 761.

The walk-off crystal blocks 751 and 761 are commercially-available elongate blocks of rutile (titanium dioxide) or yttrium vanadate with a square or rectangular cross section. These walk-off crystal blocks have faces that are polished, accurately parallel or perpendicular to one another, and accurately aligned parallel or perpendicular to the walk-off direction of the crystal. However, to reduce cost, the ends and one of the sides of the crystal block need not be polished. Unpolished surfaces are indicated by shading throughout FIGS. 16A–16D.

The walk-off crystal block 751 includes the polished top surface 753 and the polished bottom surface 754 opposite the polished top surface 753. The walk-off crystal block also includes the polished side surface 755, perpendicular to and interconnecting the polished top and bottom surfaces 753 and 754. The polished side surface serves as a reference face. The side surface 756 opposite the polished side surface 755 need not be polished. The thickness of the walk-off crystal block 751 between the top surface and the bottom surface is selected to provide the required walk-off distance between the orthogonal polarization components and the parallel polarization components of the light beams X, Y and Z. The walk-off direction 728 of the walk-off crystal block 751 is parallel to the reference surface 755. In a practical embodiment, the walk-off crystal block 751 was about 1 mm wide, 1.25 mm thick and 10 mm long.

The first plate pair block 723-1 is described above.

The Faraday rotator block 771 is an elongate block of quartz of the required thickness. The Faraday rotator block 771 includes the polished top surface 773 and the polished bottom surface 774 opposite the polished top surface 773. The Faraday rotator block also includes the polished side surface 775, perpendicular to and interconnecting the polished top and bottom surfaces 773 and 774. The polished side surface serves as a reference face. The side surface 776 opposite the polished side surface 775 need not be polished.

The perpendicular walk-off crystal block 761 includes the polished top surface 763 and the polished bottom surface 764 opposite the polished top surface 763. The perpendicular walk-off crystal block also includes the polished side surface 765, perpendicular to and interconnecting the polished top and bottom surfaces 763 and 764. The polished side surface serves as a reference face. The side surface 766 opposite the polished side surface 765 need not be polished. The thickness of the perpendicular walk-off crystal block 761 is selected to provide a walk-off distance that accurately matches the spacing between the optical axes 160 and 162 of the light beams X and Y. The walk-off direction 768 of the perpendicular walk-off crystal block 761 is perpendicular to the reference face 765. In a practical embodiment, the perpendicular walk-off crystal block 761 was about 1 mm wide, 1.25 mm thick and 10 mm long.

The component block 781 is formed by coating the top surface 753 of the walk-off crystal block 751 with a suitable adhesive, such as UV-cured epoxy, and stacking the first plate pair block 723-1 on the walk-off crystal block with the lower surface 744 of the plate pair block in contact with the top surface of the crystal block. A suitable right-angled corner jig (not shown) is preferably used to align the ends and reference faces of the blocks with one another. The jig may be contoured to offset the plate pair block 723 laterally relative to the walk-off crystal block 751 and the Faraday rotator block 776 when using the method to make the embodiment 100 shown in FIGS. 1A–1F.

Figure 16B:
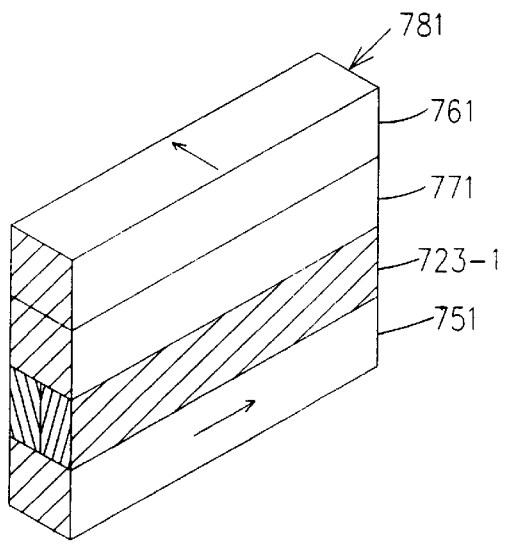
Figure 16C:
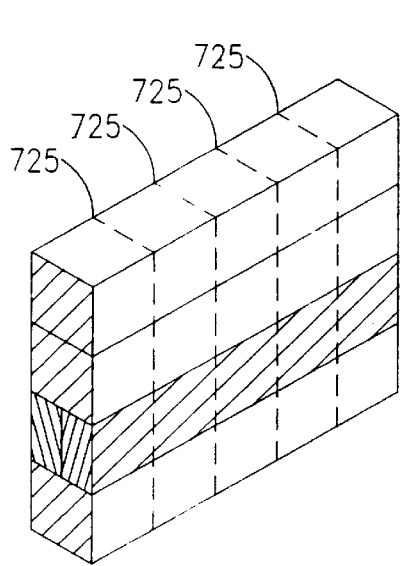

Construction of the component block 781 is continued by coating the top surface (e.g., 743) of the uppermost block in the stack with a suitable adhesive, and adding the next block, e.g., 771, to the stack with its bottom surface, e.g., 773, in contact with the top surface of the stack. This process is repeated until all the blocks have been added to the component block. If necessary, pressure is applied to the stack of blocks until the adhesive cures. The completed component block 781 is shown in FIG. 16B.

The component block 781 is divided into multiple I/O port assemblies in a dividing operation. The component block 781 is divided into individual I/O port assemblies by dividing it widthways along the broken dividing lines 725 shown in FIG. 16C. In the preferred embodiment, the dividing lines are about 1 mm apart. The component block is preferably divided by sawing, but other suitable ways of dividing, such as cleaving, may be used.

Figure 16D:
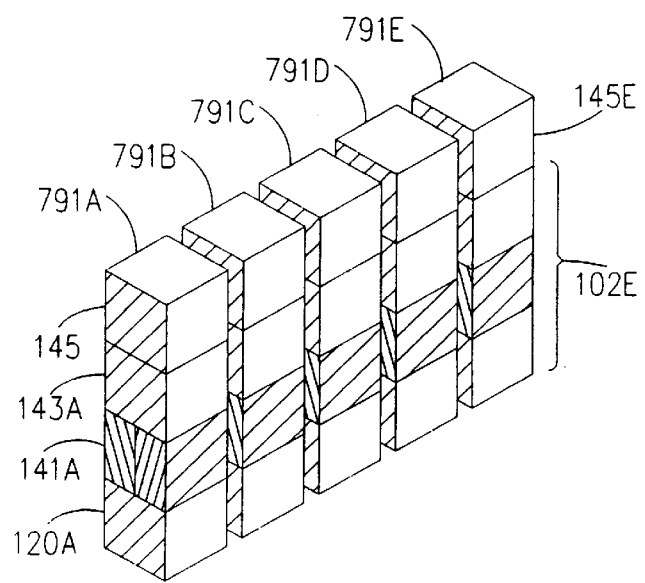

Five I/O port assemblies 791A–791E resulting from dividing the component block 781 are shown in FIG. 16D. The five I/O port assemblies are representative of the ten I/O port assemblies that were obtained from the 10 mm long component block described above. The elements of the I/O port assembly 791A are indicated using the same reference numerals as in FIGS. 5A and 5B.

The manufacturing cost associated with aligning and attaching together the blocks constituting the component block 781 are divided among the number of I/O port assemblies obtained by dividing the component block. This reduces the alignment and assembly cost of each I/O port assembly. Longer component blocks will provide greater economies of scale. Component blocks formed using longer and wider walk-off crystal blocks and Faraday rotator blocks, with multiple plate pair blocks arranged side-by-side between the walk-off crystal block and the Faraday rotator block, and that are divided by two perpendicular dividing operations will provide even greater economies of scale.

It can be seen in FIG. 16D that light passes through the walk-off crystal, opposed half-wave plate pair, Faraday rotator, and perpendicular walk-off crystal of each I/O port assembly through juxtaposed smooth, polished surfaces faces that were originally part of the smooth, polished surfaces of the respective block constituting the component block 781. No polishing of the surfaces of the individual I/O ports is required.

Batches of second I/O ports 112 are made in a similar way to the first I/O ports just described, except the second I/O ports do not have the perpendicular walk-off crystal 145 attached to them.

The above method may be readily adapted to make the I/O ports 508 and 518 shown in FIGS. 12A and 12B.

A number of variations on the embodiments described above are possible. For example, in each of the embodiments, light passing through the optical circulators in the forward direction passes through the opposed half-wave plate pair 141A of the first I/O port 102 before it passes through the Faraday rotator 143A. However, the positions of the opposed half-wave plate pair and the Faraday rotator may be interchanged, provided that the walk-off direction 128A of the adjacent walk-off crystal 120A is adjusted accordingly. Moreover, the positions of the opposed half-wave plate pair 141B and the Faraday rotator 143B in the second I/O port 112 may be interchanged so that light passing through the optical circulator in the forward direction passes through the opposed half-wave plate pair before it passes through the Faraday rotator. Again, this requires that the walk-off direction 128B of the walk-off crystal 120B be adjusted accordingly.

In the embodiment 200 shown in FIGS. 5A and 5B, all the ports PORT 1–PORT 3 are laterally displaced from the optical axis 144. However, PORT 2 may be located on the optical axis, in which case PORT 3 is laterally displaced from the optical axis by the walk-off distance of the walk-off crystal 120B.

In the embodiment 100 shown in FIGS. 1A–1F, the opposed half-wave plate pair 141 is laterally displaced relative to the optical axis. However, construction of the optical circulator may be simplified by locating the opposed half-wave plate pair on the optical axis, and displacing PORT 1 through PORT 3 laterally from the optical axis by about half the walk-off distance of the walk-off crystals 120A and 120B.

In the embodiments described in this disclosure, the Faraday rotators are shown as rotating clockwise the directions of polarization of the polarization components passing through the optical circulators in the forward direction. However, Faraday rotators that rotate the direction of polarization of the polarization components in an anti-clockwise direction may alternatively be used.

The perpendicular walk-off crystal 145 is shown as having the same walk-off distance as the walk-off crystals 120A and 120B. However, the perpendicular walk-off crystal 145 may have a different walk-off distance from the walk-off crystals 120A and 120B. For example, since the perpendicular walk-off crystal does not have to deviate the polarization components sufficiently to separate them from the line of attachment 134, the walk-off distance of the perpendicular walk-off crystal can be less than that of the walk-off crystals 120A and 120B.

The walk-off crystals 120A and 120B are shown as having equal walk-off distances. However, in those embodiments in which a lens is interposed between the first and second I/O ports, the walk-off crystals only have an equal walk-off distance when the lens forms an image of PORT 1 at PORT 3 equal in size to PORT 1, and forms an image of PORT 3 at PORT 2 equal in size to PORT 3. If the lens produces any magnification or reduction in image size, the relative walk-off distances must be adjusted accordingly.

Although this disclosure describes illustrative embodiments of the invention in detail, it is to be understood that the invention is not limited to the precise embodiments described, and that various modifications may be practiced within the scope of the invention defined by the appended claims.

I claim:

1. A miniature three-port optical circulator, the optical circulator having an optical axis, and comprising:
    a first input/output (I/O) port including the following components arranged in order along the optical axis:
        a light coupling assembly, comprising:
            a capillary having a bore and an end, the end being perpendicular to the bore, the bore having a diameter; and
            two optical fibres secured side-by-side in the bore of the capillary, the optical fibres each having a diameter of one half of the diameter of the bore and including a core, the cores of the optical fibres being separated from one another in a separation direction by a separation distance,
        a first walk-off crystal adjacent the light coupling assembly, the first walk-off crystal having a first walk-off direction perpendicular to the separation direction, and
        a split polarization rotator adjacent the first walk-off crystal, the split polarization rotator having a positive half and a negative half and being located so that polarization components of the light beams deviated by the first walk-off crystal pass through a different one of the positive half and the negative half from polarization components not deviated by the first walk-off crystal;
    a second I/O port complementary to the first I/O port; and
    a second walk-off crystal located between the first I/O port and the second I/O port, the second walk-off crystal having a second walk-off direction perpendicular to the first walk-off direction, and having a walk-off distance equal to the separation distance.

2. The optical circulator of claim 1, in which:
    in the first I/O port, the first walk-off direction is towards one of the positive half and the negative half of the split polarization rotator; and
    the second I/O port includes the following components arranged in order along the optical axis:
        an additional split polarization rotator having a positive half and a negative half, and
        a third walk-off crystal having a third walk-off direction, the third walk-off direction being towards the positive half of the additional split polarization rotator when the first walk-off direction is towards the positive half of the split polarization rotator, and being towards the negative half of the additional split polarization rotator when the first walk-off direction is towards the negative half of the split polarization rotator.

3. The optical circulator of claim 2, in which the second I/O port additionally includes an additional light coupling assembly following the third walk-off crystal on the optical axis.

4. The optical circulator of claim 2, in which the second I/O port additionally includes:
 an optical fibre parallel to the optical axis, the optical fibre having a core; and
 a lens located on the optical axis between the third walk-off crystal and the optical fibre to form an image of part of the third walk-off crystal on the core of the optical fibre.

5. The optical circulator of claim 1, additionally comprising a lens located on the optical axis between the second walk-off crystal and one of the first I/O port and the second I/O port.

6. The optical circulator of claim 5, in which the lens is one element of a lens array.

7. The optical circulator of claim 1, in which one of the two optical fibres is located on the optical axis.

8. The optical circulator of claim 1, in which:
 the first walk-off crystal has a first walk-off distance; and
 both optical fibres are laterally offset from the optical axis by a distance of about one-half of the first walk-off distance.

9. The optical circulator of claim 1, in which the optical fibres are thermally-diffused, expanded-core, single-mode optical fibres having an outside diameter of less than 200 μm.

10. The optical circulator of claim 1, in which the split polarization rotator includes the following components arranged in either order along the optical axis:
 an opposed half-wave plate pair including a positive half-wave plate and a negative half-wave plate attached to one another at a line of attachment disposed substantially parallel to the separation direction; and
 a 90° Faraday rotator.

11. The optical circulator of claim 10, in which:
 the positive half-wave plate has an axis oriented at +22.5° to the line of attachment; and
 the negative half-wave plate has an axis oriented at −22.5° to the line of attachment.

12. A miniature three-port optical circulator, the optical circulator having an optical axis, and comprising:
 a first input/output (I/O) port, the first I/O port receiving two parallel light beams laterally separated from one another in a separation direction by a separation distance, the first I/O port including the following components arranged in order along the optical axis:
  a first walk-off crystal located to receive the light beams, the first walk-off crystal having a first walk-off direction perpendicular to the separation direction and a first walk-off distance, the first walk-off crystal comprising the following components arranged in order along the optical axis:
   a first walk-off crystal element;
   a second walk-off crystal element, the first walk-off crystal element and the second walk-off crystal element having opposite walk-off directions parallel to the first walk-off direction, and having substantially equal walk-off distances totalling the first walk-off distance; and
   a 45° half-wave plate located between the first walk-off crystal element and the second walk-off crystal element, and
  a split polarization rotator adjacent the first walk-off crystal, the split polarization rotator having a positive half and a negative half and being located so that polarization components of the light beams deviated by the first walk-off crystal pass through a different one of the positive half and the negative half from polarization components not deviated by the first walk-off crystal;
 a second I/O port complementary to the first I/O port; and
 a second walk-off crystal located between the first I/O port and the second I/O port, the second walk-off crystal having a second walk-off direction perpendicular to the first walk-off direction, and having a walk-off distance equal to the separation distance.

13. The optical circulator of claim 12, in which:
 in the first I/O port, the first walk-off direction is towards one of the positive half and the negative half of the split polarization rotator; and
 the second I/O port includes the following components arranged in order along the optical axis:
  an additional split polarization rotator having a positive half and a negative half, and
  a third walk-off crystal having a third walk-off distance and a third walk-off direction, the third walk-off direction being towards the positive half of the additional split polarization rotator when the first walk-off direction is towards the positive half of the split polarization rotator, and being towards the negative half of the additional split polarization rotator when the first walk-off direction is towards the negative half of the split polarization rotator, the third walk-off crystal including the following components arranged in order along the optical axis:
   a third walk-off crystal element,
   a fourth walk-off crystal element, the third walk-off crystal element and the fourth walk-off crystal element having opposite walk-off directions parallel to the third walk-off direction, and having substantially equal walk-off distances totalling the third walk-off distance, and
   a 45° half-wave plate located between the third walk-off crystal element and the fourth walk-off crystal element.

14. The optical circulator of claim 12, in which the first I/O port additionally includes a light coupling assembly that defines the separation direction and separation distance between the two light beams.

15. The optical circulator of claim 14, in which the light coupling assembly includes:
 a capillary having a bore and an end, the end being perpendicular to the bore and being attached to a surface of the first walk-off crystal remote from the split polarization rotator, the bore having a diameter; and
 two optical fibres secured side-by-side in the bore of the capillary, the optical fibres each having a diameter of one half of the diameter of the bore.

16. The optical circulator of claim 12, in which the split polarization rotator includes the following components arranged in either order along the optical axis:
 an opposed half-wave plate pair including a positive half-wave plate and a negative half-wave plate attached to one another at a line of attachment disposed substantially parallel to the separation direction; and
 a 90° Faraday rotator.

17. A miniature three-port optical circulator, the optical circulator defining an optical axis and comprising:
 a first I/O port, including:
  light coupling means for accurately defining a lateral separation distance and separation direction between two light beams and for projecting the light beams with a small lateral beam spread, the light coupling means comprising:

a capillary having a bore and an end, the end being perpendicular to the bore, the bore having a diameter; and two optical fibres secured side-by-side in the bore of the capillary, the optical fibres each having a diameter of one half of the diameter of the bore;

a first walk-off crystal located to receive the light beams from the light coupling means, the first walk-off crystal having a first walk-off direction perpendicular to the separation direction, and dividing each of the light beams into an orthogonal polarization component and a parallel polarization component laterally spaced from one another in the first walk-off direction, each of the polarization components having a direction of polarization, and first split polarization rotating means for parallelizing the polarization components from the first walk-off crystal to align the directions of polarization of all four polarization components parallel to the separation direction, and for additionally setting perpendicular to one another initially parallel polarization components passing through the first split polarization rotating means in a direction opposite to the polarization components from the first walk-off crystal;

a second walk-off crystal having a walk-off direction parallel to the separation direction, and a walk-off distance substantially equal to the lateral separation distance;

a second I/O port, including:

second split polarization rotating means for setting perpendicular to one another the polarization components from the second walk-off crystal to align the directions of polarization of one of (a) the orthogonal polarization components, and (b) the parallel polarization components, parallel to the first walk-off direction, and additionally for parallelizing initially perpendicular polarization components passing through the second split polarization rotating means in a direction opposite to the polarization components from the second walk-off crystal to align the directions of polarization of all four polarization components perpendicular to the separation direction, and a third walk-off crystal located to receive the polarization components from the second split polarization rotating means, the third walk-off crystal having a third walk-off direction parallel to the first walk-off direction, and operating to combine one of the orthogonal polarization components and one of the perpendicular polarization components to form an output light beam.

18. The optical circulator of claim 17, in which at least one of the first split polarization rotating means and the second split polarization rotating means includes the following components arranged in either order along the optical axis:

an opposed half-wave plate pair including a positive half-wave plate and a negative half-wave plate attached to one another at a line of attachment disposed substantially parallel to the separation direction; and a 90° Faraday rotator.

19. The optical circulator of claim 18, in which:

the positive half-wave plate has an axis oriented at +22.5° to the line of attachment; and the negative half-wave plate has an axis oriented at −22.5° to the line of attachment.

20. A method of making a miniature optical circulator, the method comprising steps of:

providing a walk-off crystal block, a plate pair block, a Faraday rotator block, and a perpendicular walk-off crystal block, each of the blocks having opposed polished surfaces, the plate pair block including a line of attachment;

stacking the walk-off crystal block, plate pair block, Faraday rotator block, and perpendicular walk-off crystal block with the polished surfaces juxtaposed, and a film of adhesive between the juxtaposed polished surfaces, to form a component block; and dividing the component block along multiple dividing lines oriented in at least one direction perpendicular to the line of attachment to form multiple I/O port assemblies.

21. The method of claim 20, in which the step of providing a plate pair block includes steps of:

providing an elongate positive half-wave plate block and an elongate negative half-wave plate block, each half-wave plate block having polished side, top, and bottom surfaces, the positive half-wave plate block having an axis at +22.5° to its polished side surfaces, the negative half-wave plate block having an axis at −22.5° to its polished side surfaces;

dividing each of the half-wave plate blocks in half lengthways to provide two positive half-wave plate halves and two negative half-wave plate halves, each of the half-wave plate halves having one polished side surface opposite a rough side surface; and attaching each of the positive half-wave plate halves to one of the negative half-wave plate halves with the polished side surfaces juxtaposed.

* * * * *